United States Patent
Nakajima

(10) Patent No.: US 10,880,444 B2
(45) Date of Patent: Dec. 29, 2020

(54) IMAGE PROCESSING APPARATUS, CONTROL METHOD OF IMAGE PROCESSING APPARATUS, AND STORAGE MEDIUM FOR DETECTING AND DISPLAYING CONTENTS OF OPERATION

(71) Applicant: CANON KABUSHIKI KAISHA, Tokyo (JP)

(72) Inventor: Junko Nakajima, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 15/864,514

(22) Filed: Jan. 8, 2018

(65) Prior Publication Data

US 2018/0198931 A1 Jul. 12, 2018

(30) Foreign Application Priority Data

Jan. 11, 2017 (JP) ................. 2017-002711

(51) Int. Cl.
*H04N 1/00* (2006.01)
*G06K 15/00* (2006.01)

(52) U.S. Cl.
CPC ....... *H04N 1/00506* (2013.01); *G06K 15/408* (2013.01); *H04N 1/00015* (2013.01); *H04N 1/00037* (2013.01); *H04N 1/00076* (2013.01); *H04N 1/00084* (2013.01); *H04N 1/00543* (2013.01)

(58) Field of Classification Search
CPC ... G06F 3/1229; G06F 3/121; H04N 1/00002; H04N 1/00007; H04N 1/00037; H04N 1/00071; H04N 1/00074; H04N 1/00076; H04N 1/00543; H04N 1/00546; H04N 1/00551; H04N 1/0035–00517; G03G 15/70; G06K 15/4085

See application file for complete search history.

(56) References Cited

U.S. PATENT DOCUMENTS

| | | | | |
|---|---|---|---|---|
| 2007/0223029 A1* | 9/2007 | Nonaka | ............... | G03G 15/5012 358/1.14 |
| 2008/0247768 A1* | 10/2008 | Yamada | ................. | G03G 15/70 399/21 |
| 2010/0196025 A1* | 8/2010 | Ogura | .................... | G03G 15/11 399/43 |
| 2011/0320928 A1* | 12/2011 | Kuroda | ............... | G06F 11/0733 715/234 |

(Continued)

FOREIGN PATENT DOCUMENTS

JP 2015-82706 A 4/2015

*Primary Examiner* — Nicholas Pachol
(74) *Attorney, Agent, or Firm* — Canon U.S.A., Inc. IP Division

(57) ABSTRACT

An image processing apparatus includes a first detection unit that detects occurrence of a maintenance event, a receiving unit that receives a display instruction of a maintenance method corresponding to the maintenance event from a user, a display control unit that displays a first maintenance screen including an image illustrating the maintenance method and an instruction of opening a cover and exposing a portion where the maintenance event occurred and displays a second maintenance screen including an image illustrating the maintenance method and an instruction of opening the cover when occurrence of the maintenance event is not detected.

19 Claims, 17 Drawing Sheets

(56) References Cited

U.S. PATENT DOCUMENTS

| | | | | |
|---|---|---|---|---|
| 2012/0050784 | A1* | 3/2012 | Kawaura | G06F 3/1207 358/1.14 |
| 2012/0294634 | A1* | 11/2012 | Nishikawa | G03G 15/0862 399/38 |
| 2014/0055807 | A1* | 2/2014 | Uchikawa | H04N 1/00408 358/1.14 |
| 2014/0092153 | A1* | 4/2014 | Kikkawa | B41J 11/006 347/5 |
| 2015/0055166 | A1* | 2/2015 | Tachibana | H04N 1/00408 358/1.14 |
| 2015/0109637 | A1* | 4/2015 | Ikeda | H04N 1/0049 358/1.15 |
| 2015/0154877 | A1* | 6/2015 | Ikeda | G09B 5/02 434/379 |
| 2015/0172477 | A1* | 6/2015 | Yamamoto | H04N 1/32657 358/1.15 |
| 2017/0208205 | A1* | 7/2017 | Ikeda | G03G 15/502 |
| 2017/0366698 | A1* | 12/2017 | Asai | H04N 1/00037 |
| 2018/0007227 | A1* | 1/2018 | Komaba | H04N 1/00419 |
| 2018/0089016 | A1* | 3/2018 | Tachibana | G06F 11/0733 |
| 2018/0091666 | A1* | 3/2018 | Tachibana | G03G 15/502 |

* cited by examiner

FIG.4A

| MAINTENANCE ID | MOVING IMAGE LIST |
| --- | --- |
| 001 | A1, A2, A3 |
| 002 | B1, B2, B3, B10 |
| 003 | B1, B4, B5, B10 |
| 004 | B1, B6, B7, B10 |
| 005 | B1, B8, B9, B10 |
| 006 | B1, B2, B3, B4, B5, B10 |
| 007 | B1, B2, B3, B6, B7, B10 |
| 008 | B1, B2, B3, B8, B9, B10 |
| 009 | B1, B4, B5, B6, B7, B10 |
| 010 | B1, B4, B5, B8, B9, B10 |
| 011 | B1, B6, B7, B8, B9, B10 |
| 012 | B1, B2, B3, B4, B5, B6, B7, B10 |
| 013 | B1, B2, B3, B4, B5, B8, B9, B10 |
| 014 | B1, B2, B3, B6, B7, B8, B9, B10 |
| 015 | B1, B4, B5, B6, B7, B8, B9, B10 |
| 016 | B1, B2, B3, B4, B5, B6, B7, B8, B9, B10 |
| 017 | C1, C2, C4 |
| 018 | C1, C3, C4 |
| 019 | C1, C2, C3, C4 |
| ... | |

FIG.4B

| MOVING IMAGE ID | MOVING IMAGE FILE | REPRODUCTION TIME | COVER OPENING/ CLOSING FLAG | MESSAGE |
|---|---|---|---|---|
| A1 | /movie/A1.mpeg | 0:13 | 0 | PLEASE PREPARE NEW TONER COLLECTION CONTAINER AND OPEN FRONT COVER. |
| A2 | /movie/A2.mpeg | 0:14 | 1 | PLEASE HOLD HANDLE AND TAKE OUT TONER COLLECTION CONTAINER. |
| A3 | /movie/A3.mpeg | 0:27 | 1 | PLEASE SET NEW TONER COLLECTION CONTAINER AND CLOSE FRONT COVER. |
| B1 | /movie/B1.mpeg | 0:13 | 0 | PLEASE PREPARE NEW TONER CONTAINER AND OPEN FRONT COVER. |
| B2 | /movie/B2.mpeg | 0:10 | 1 | PLEASE TAKE OUT BLACK TONER CONTAINER. |
| B3 | /movie/B3.mpeg | 0:30 | 1 | PLEASE SET NEW BLACK TONER CONTAINER ALL THE WAY INSIDE. |
| B4 | /movie/B4.mpeg | 0:10 | 1 | PLEASE TAKE OUT YELLOW TONER CONTAINER. |
| B5 | /movie/B5.mpeg | 0:30 | 1 | PLEASE SET NEW YELLOW TONER CONTAINER ALL THE WAY INSIDE. |
| B6 | /movie/B6.mpeg | 0:10 | 1 | PLEASE TAKE OUT MAGENTA TONER CONTAINER. |
| B7 | /movie/B7.mpeg | 0:30 | 1 | PLEASE SET NEW MAGENTA TONER CONTAINER ALL THE WAY INSIDE. |
| B8 | /movie/B8.mpeg | 0:10 | 1 | PLEASE TAKE OUT CYAN TONER CONTAINER. |
| B9 | /movie/B9.mpeg | 0:30 | 1 | PLEASE SET NEW CYAN TONER CONTAINER ALL THE WAY INSIDE. |
| B10 | /movie/B10.mpeg | 0:17 | 1 | PLEASE CLOSE FRONT COVER. |
| C1 | /movie/C1.mpeg | 0:20 | 0 | PLEASE OPEN RIGHT COVER. |
| C2 | /movie/C2.mpeg | 0:15 | 1 | PLEASE REMOVE JAMMED SHEET AT ILLUSTRATED POSITION. |
| C3 | /movie/C3.mpeg | 0:15 | 1 | PLEASE REMOVE JAMMED SHEET AT TWO-SIDED CONVEYANCE UNIT. |
| C4 | /movie/C4.mpeg | 0:10 | 1 | PLEASE CLOSE RIGHT COVER. |
| | | | | ... |

US 10,880,444 B2

IMAGE PROCESSING APPARATUS, CONTROL METHOD OF IMAGE PROCESSING APPARATUS, AND STORAGE MEDIUM FOR DETECTING AND DISPLAYING CONTENTS OF OPERATION

BACKGROUND

Field

The present disclosure relates to an image processing apparatus that displays a moving image illustrating a maintenance method, a control method of the image processing apparatus, and a storage medium.

Description of the Related Art

An image forming apparatus includes an openable/closable cover for exposing a sheet conveyance unit. A cover closing screen that prompts a user to close the cover is displayed if the cover is opened when a jam does not occur. This is because a print job cannot be executed if the cover is open.

There is provided an image forming apparatus that provides a moving image illustrating a series of operations necessary for removing a jammed sheet when a jam has occurred in the sheet conveyance path (see Japanese Patent Application Laid-Open No. 2015-82706). For example, moving images illustrating respective operations of opening a cover and exposing a conveyance unit, removing a jammed sheet from the conveyance unit after opening the cover, and closing the cover after removing the jammed sheet are produced in that order. A user opens a cover, removes a jammed sheet, and closes the cover while checking the moving images.

As described above, conventionally, the cover closing screen is displayed if the above-described cover is opened when a jam does not occur. The cover closing screen is not displayed while a moving image illustrating the clearance of a jam is being displayed because the clearance of the jam has to be preferentially performed.

SUMMARY

According to an aspect of the present disclosure, an image processing apparatus includes a first detection unit configured to detect occurrence of a maintenance event, a receiving unit configured to receive a display instruction of a maintenance method corresponding to the maintenance event, a display control unit configured to display, based on occurrence of the detected maintenance event, a first maintenance screen including an image illustrating the maintenance method and an instruction of opening a cover and exposing a portion of the image processing apparatus where the maintenance event occurred, and to display a second maintenance screen, based on the received display instruction of the maintenance method when occurrence of the maintenance event is not detected by the first detection unit, including an image illustrating the maintenance method and an instruction of opening the cover, and a sensing unit configured to detect an opening/closing state of the cover, wherein, in a case where an opening state of the cover is detected while the second maintenance screen is being displayed, the display control unit controls a cover closing screen that prompts a user to close the cover to be displayed if a job in execution or in an execution queue exists and controls the cover closing screen not to be displayed if a job in execution or in an execution queue does not exist.

Further features will become apparent from the following description of exemplary embodiments with reference to the attached drawings.

BRIEF DESCRIPTION OF THE DRAWINGS

FIGS. 4A and 4B are data structure diagrams defining a relationship between a maintenance event and a moving image of the exemplary embodiment.

DESCRIPTION OF THE EMBODIMENTS

Hereinafter, an exemplary embodiment will be described with reference to the appended drawings.

<Overview>

In order to enable a user to check and learn operations that have to be performed at the time of occurrence of a jam, there has been a demand for a function of displaying a moving image illustrating the operations even if a jam does not occur, i.e., a display function of an optional reproduction moving image. For example, this function is used when an installation technician of an image forming apparatus explains a jam clearance operation to a client.

In such a case, the installation technician shows a moving image to the client, actually opens a cover according to the contents of the moving image, and provides an explanation while directly showing the portion to be operated.

When the above-described use case is assumed, it is desirable for the cover closing screen not to be displayed if the cover is opened while the optional reproduction moving image is being displayed. If the cover closing screen is not displayed at all, even if a print job is input from another user while the optional reproduction moving image is being displayed, the print job will not be executed as long as the cover is kept open.

The present exemplary embodiment is directed to a technique of appropriately controlling display or non-display of the cover closing screen in a case where the cover is opened while a screen illustrating a maintenance method is being displayed.

<Configuration of Image Forming Apparatus 100>

Figure 1:
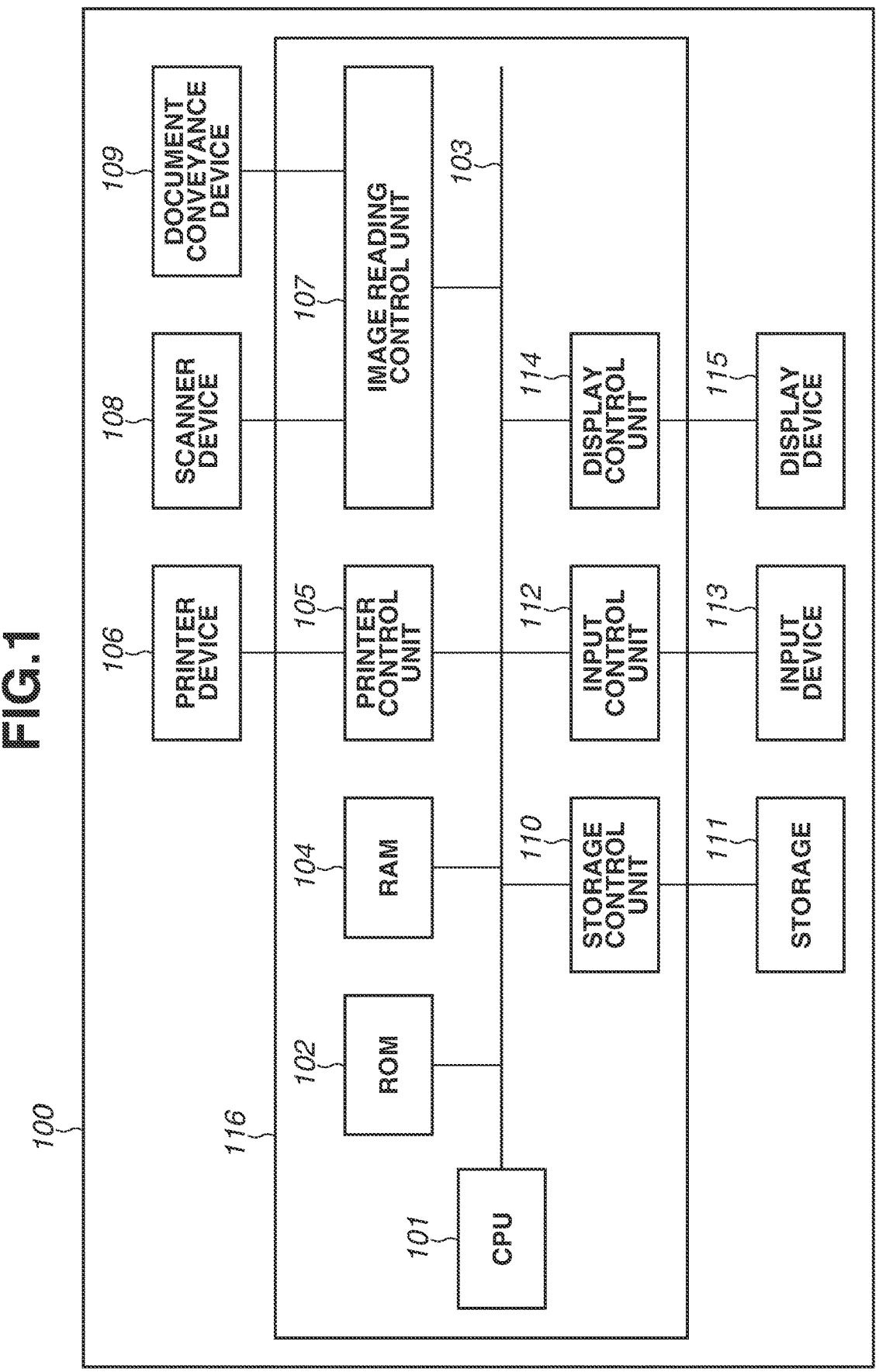
FIG. 1 is a block diagram schematically illustrating a configuration of an image forming apparatus of an exemplary embodiment.

FIG. 1 is a diagram schematically illustrating a configuration of an image forming apparatus 100 of a first exemplary embodiment.

In FIG. 1, the image forming apparatus 100 includes a central processing unit (CPU) 101, a read only memory (ROM) 102, a random access memory (RAM) 104, a printer control unit 105, an image reading control unit 107, a storage control unit 110, an input control unit 112, and a display control unit 114. These units are connected to each other via a bus 103 to constitute a controller 116. The image forming apparatus 100 also includes a storage 111, a printer device 106, a scanner device 108, a document conveyance device 109, an input device 113, and a display device 115.

The CPU 101 controls the entire image forming apparatus 100. The CPU 101 boots an operating system (OS) by a boot program stored in the ROM 102. Then, the CPU 101 executes a program stored in the storage 111 using the OS.

The RAM 104 is used as a temporary storage area, such as a main memory or a work area, of the CPU 101. When the CPU 101 executes the program, the program is read out from the storage 111 and stored in the RAM 104.

The printer control unit 105 controls the printer device 106 to print image data on a sheet, such as paper. The printer device 106 prints image data on a sheet.

The image reading control unit 107 controls the scanner device 108 to read an image on a document to generate image data. The image reading control unit 107 controls the document conveyance device 109, such as an auto-document feeder (ADF), to individually convey documents placed on a document positioning plate of the document conveyance device 109 to the scanner device 108, and generates image data. The scanner device 108 scans a document by using an optical reading device, such as a charge coupled device (CCD) sensor, and converts image information of the document into electric signal data.

The storage 111 is a readable/writable non-volatile storage device, such as a hard disk drive (HDD). Data of various types, i.e., a program for controlling the entire image forming apparatus 100, various application programs, and a moving image illustrating a series of operations necessary to solve a maintenance event, are stored in the storage 111. Then, the respective programs are executed by the CPU 101. The storage control unit 110 controls the storage 111.

The input control unit 112 receives an operation instruction from a user via the input device 113, such as a touch panel or a hard key. The display control unit 114 controls the display device 115, such as a liquid crystal display (LCD) or a cathode-ray tube (CRT) display, to display an operation screen or a moving image to the user.

<External View of Image Forming Apparatus 100>

Figure 2:
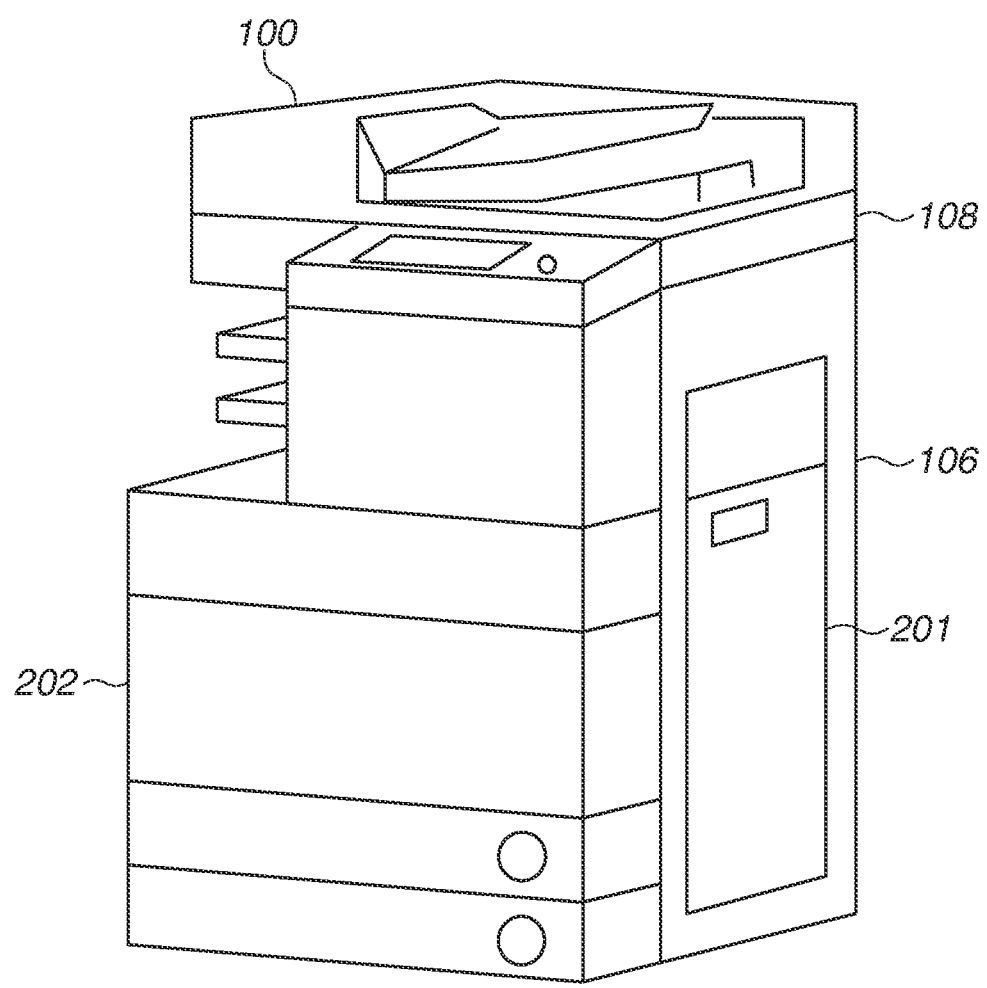
FIG. 2 is a diagram illustrating an external view of the image forming apparatus of the exemplary embodiment.

FIG. 2 is a diagram illustrating an external view of the image forming apparatus 100.

In FIG. 2, the image forming apparatus 100 includes a right cover 201 and a front cover 202. The right cover 201 enables a user to expose a sheet conveyance path to remove a jammed sheet. The front cover 202 enables a user to expose an attachment position of a toner container or a toner collection container to perform replacement work thereof.

The image forming apparatus 100 includes a sensor for detecting an opening/closing state of the above-described right cover 201 or the front cover 202.

<Cross-Sectional View Illustrating Internal Structure of Image Forming Apparatus 100>

Figure 3:
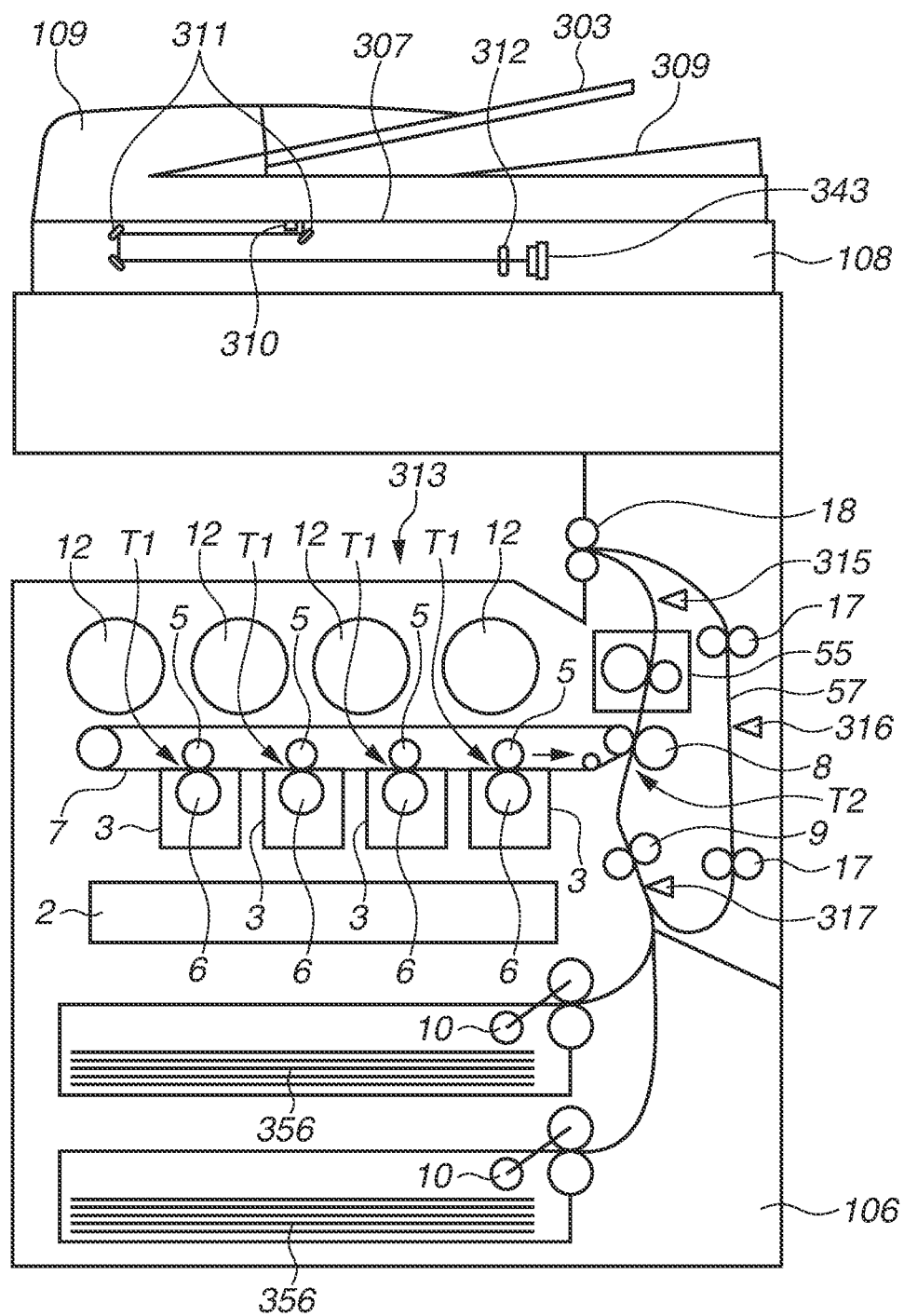
FIG. 3 is a cross-sectional diagram illustrating an internal structure of the image forming apparatus of the exemplary embodiment.

FIG. 3 is a cross-sectional diagram illustrating an internal structure of the image forming apparatus 100. FIG. 3 illustrates one example of the internal structure of the image forming apparatus 100 which forms an image in full colors of yellow, magenta, cyan, and black.

The image forming apparatus 100 is a so-called tandem type image forming apparatus in which four photosensitive drums 6 serving as image bearing members for bearing toner images of respective colors of yellow, magenta, cyan, and black are arranged in a rotation direction of an intermediate transfer belt 7 serving as an intermediate transfer member. The above-described image forming apparatus 100 includes the scanner device 108, the document conveyance device 109, and the printer device 106.

First, reading processing executed by the scanner device 108 will be described. When the reading is executed by placing a document on a document positioning plate 307, the user places a document on the document positioning plate 307 and closes the document conveyance device 109. When an opening/closing sensor detects closing of the document conveyance device 109, a reflection-type document size detection sensor provided inside a housing of the scanner device 108 detects a size of the document placed on the document positioning plate 307.

When the document size is detected, the document is irradiated with light emitted from a light source 310, and the irradiation light enters a CCD 343 via a reflection plate 311 and a lens 312. The CCD 343 converts the incident light into a digital signal and transmits the digital signal to a controller of the scanner device 108. The controller executes desired image processing on the transmitted digital signal to convert the digital signal into a laser recording signal, and stores the laser recording signal in a memory as image data.

When the reading is executed by placing a document on the document conveyance device 109, the user places a document on a tray of a document setting unit 303 of the document conveyance device 109, with a reading face thereof facing upward. When the document is placed, a document presence/absence detection sensor detects presence of the placed document. The controller detects the placed document via the document presence/absence detection sensor and rotates a document feeding roller and a conveyance belt to convey the document to a predetermined reading position on the document positioning plate 307. After the document is conveyed to a predetermined reading position, the controller executes reading of the document and stores image data generated by the reading of the document in a memory. Then, the document on which reading has been performed is discharged to a document discharge tray 309 via a conveyance roller.

If a plurality of documents is placed on the document conveyance device 109, the controller discharges the read document and concurrently feeds a next document through a feeding roller to execute next reading. As described above, reading of the plurality of documents is executed.

Next, printing executed by the printer device 106 will be described. The printer device 106 includes process cartridges 3 of respective colors, exposure units (not illustrated) for irradiating respective photosensitive drums 6 with laser light, the intermediate transfer belt 7, primary transfer rollers 5 as primary transfer units, a secondary transfer roller 8 as a secondary transfer unit, and a fixing unit 55.

Each of the process cartridges 3 includes a photosensitive drum 6, a charging unit (not illustrated), a development unit, and a cleaner that are arranged in the periphery of the photosensitive drum 6. The intermediate transfer belt 7 is stretched upon a plurality of tension rollers, arranged adjacent to the process cartridges 3, and brought into contact with the respective photosensitive drums 6. One of the tension rollers (i.e., driving roller) connected to a motor (not illustrated) is rotationally driven thereby, so that the intermediate transfer belt 7 is rotated in a direction indicated by an arrow in FIG. 3.

The primary transfer rollers 5 are arranged at positions facing the photosensitive drums 6, with the intermediate transfer belt 7 therebetween. On a downstream side of the process cartridges 3 in a rotation direction of the intermediate transfer belt 7, the secondary transfer roller 8 is arranged and brought into contact with the intermediate transfer belt 7, so that a secondary transfer portion T2 is formed by the secondary transfer roller 8 and the intermediate transfer belt 7. The exposure unit (not illustrated) is arranged on each of the process cartridges 3, at a position on the opposite side of the intermediate transfer belt 7. Based on the information read by the scanner device 108 or the information transmitted from the outside, the exposure unit irradiates the photosensitive drum 6 with laser light.

In the present exemplary embodiment, the image forming apparatus 100 includes toner containers 12 for supplying toner of respective colors to the development units of the process cartridges 3. The fixing unit 55 is arranged on a downstream side of the secondary transfer portion T2, and applies heat and pressure to a recording material that carries a toner image to fix the toner image on the recording material. The printer device 106 includes a plurality of cassettes 356 for storing sheets. The sheets are picked up from the cassettes 356, conveyed to the secondary transfer portion T2 and the fixing unit 55, and discharged to a discharge port 313 after fixing is executed thereon. The printer device 106 also includes a mechanism for inverting and conveying a sheet in order to execute two-sided printing.

The image forming apparatus 100 configured as the above executes image forming as follows. First, surfaces of the photosensitive drums 6 of respective colors are charged by the charging units and exposed to light by the exposure units (not illustrated), so that latent images are formed on the photosensitive drums 6. The latent images are developed by the development units, so that toner images are formed on the photosensitive drums 6. The toner images formed on the photosensitive drums 6 reach primary transfer portions T1 where the photosensitive drums 6 are in contact with the intermediate transfer belt 7.

A primary transfer bias is then applied to the primary transfer rollers 5 at the primary transfer portions T1, so that the toner images formed on the photosensitive drums 6 are sequentially transferred to the intermediate transfer belt 7, so that a full-color toner image is formed on the intermediate transfer belt 7. This toner image is conveyed to the secondary transfer portion T2 along with the rotation of the intermediate transfer belt 7.

The sheet supplied from the cassette 356 is conveyed toward the secondary transfer portion T2. In other words, the sheet is individually fed from the cassette 356 by a pick-up roller 10 and conveyed to the secondary transfer portion T2 by a registration roller 9 after a conveyance timing thereof is adjusted with that of the toner image on the intermediate transfer belt 7. Then, a secondary transfer bias is applied to the secondary transfer roller 8 at the secondary transfer portion T2, so that the toner image on the intermediate transfer belt 7 is secondarily transferred to the sheet. Thereafter, the sheet on which the toner image is transferred is conveyed to the fixing unit 55, and heated and pressurized thereby. Therefore, toner of respective colors is fused and mixed together, so that the toner image is fixed to the sheet as a printed image. The sheet on which the image is fixed is discharged to the discharge port 313 by a discharge roller 18 provided on the downstream side of the fixing unit 55 with the printed face thereof facing downward.

Toner (transfer residual toner) remaining on the surface of the photosensitive drum 6 after the transfer is removed and collected from the surface of the photosensitive drum 6 by a cleaning device, such as a cleaning unit. The cleaning device includes a cleaning blade (not illustrated) as a cleaning member arranged to abut on the photosensitive drum 6 and a toner collection container 2 for storing transfer residual toner scraped from the surface of the rotating photosensitive drum 6 by the cleaning blade. The toner collection container 2 can detect a collected toner amount using a sensor (not illustrated).

When two-sided printing is executed, the sheet on which fixing is executed is discharged to the discharge port 313 with its printed face facing downward and conveyed in a switchback manner by utilizing its internal structure. Thereafter, the sheet is conveyed to a conveyance path 57 for two-sided printing by an inverting conveyance roller 17 and supplied to the secondary transfer portion T2 again. Then, an image is transferred to the sheet at the secondary transfer portion T2. The sheet on which the image is transferred passes through the fixing unit 55, and is discharged to the discharge port 313 by the discharge roller 18.

A discharge sensor 315, a two-sided conveyance sensor 316, and a pre-registration sensor 317 detect presence or absence of a stuck printing sheet. A jam is detected by these sensors. Either a mechanical flag or an optical sensor can be used for the above sensors.

<Moving Image File>

FIGS. 4A and 4B are diagrams respectively illustrating a moving image list table 400 and a moving image table 410 stored in the storage 111 in FIG. 1. In the present exemplary embodiment, a moving image illustrating a series of operations displayed at the time of detecting the occurrence of a maintenance event, such as a lack of toner, a full state of waste toner, or a jam, is called as "event occurrence moving image". A moving image illustrating a series of operations displayed when a display instruction of a maintenance method is received from a user in a state where the maintenance event does not occur is called as "optional reproduction moving image".

FIG. 4A is a diagram illustrating the moving image list table 400. The moving image list table 400 defines a relationship between a maintenance event, such as a lack of toner, a full state of waste toner, or a jam, and a moving image to be reproduced when occurrence of the maintenance event is detected. A maintenance identification (ID) 401 and a moving image list 402 are stored in the moving image list table 400 in association with each other. The maintenance ID 401 is information for identifying a maintenance event occurring in the image forming apparatus 100.

In FIG. 4A, a maintenance ID 001 represents a full state of waste toner detected by the printer device 106. Maintenance IDs 002, 003, 004, and 005 respectively represent a lack of black toner, a lack of yellow toner, a lack of magenta toner, and a lack of cyan toner, which are also detected by the printer device 106.

Maintenance IDs 006 to 011 represent a lack of toner of two colors, maintenance IDs 012 to 015 represent a lack of toner of three colors, and a maintenance ID 016 represents a lack of toner of all colors, which are also detected by the printer device 106. Here, "a lack of toner" refers not only to a state where the toner is completely consumed, but also to a state where an amount of toner is less than a predetermined threshold value.

A maintenance ID 017 represents a jam at a conveyance unit that is detected by the discharge sensor 315 or the pre-registration sensor 317. A maintenance ID 018 represents a jam at a two-sided conveyance unit that is detected by the two-sided conveyance sensor 316. A maintenance ID 019 represents a compound jam at the conveyance unit and the two-sided conveyance unit that is detected by either the discharge sensor 315 or the pre-registration sensor 317 and the two-sided conveyance sensor 316.

The moving image list 402 illustrates a list of moving images to be reproduced when each of the maintenance events occurs. When the maintenance event occurs, a series of operations (i.e., maintenance method) necessary to solve the maintenance event is provided to the user. For example, the series of operations consists of a plurality of operations of opening a cover, removing a jammed sheet, and closing a cover. In the below-described exemplary embodiment, a moving image of each of the operations is referred to as "partial moving image". A combination of partial moving images and a reproduction order of each partial moving image are stored in the moving image list 402 in association with the maintenance ID 401.

For example, if the maintenance event is a full state of waste toner, the combination of partial moving images can be partial moving images A1, A2, and A3 listed in the corresponding moving image list 402. The reproduction order is an order described in the moving image list 402, and the partial moving images are reproduced in the order of A1, A2, and A3 if the maintenance event is the full state of waste toner. Similarly, if the maintenance event is a lack of toner or a jam, a plurality of partial moving images corresponding to the occurring maintenance event is reproduced in the order described in the moving image list 402.

In the present exemplary embodiment, even when the maintenance event, such as a lack of toner, a full state of waste toner, or a jam, does not occur, the user can optionally check the operations of replacement of a toner container, replacement of a toner collection container, or clearance of a jam. The moving image list table 400 also illustrates a moving image to be displayed when an instruction of a maintenance method is received from the user when the maintenance event does not occur.

For example, if a display instruction of replacement of a toner collection container is received from the user, partial moving images A1, A2, and A3 corresponding to the maintenance ID 001 are sequentially reproduced. If a display instruction of replacement of a toner container is received from the user, partial moving images B1, B2, B3, B4, B5, B6, B7, B8, B9, and B10 corresponding to the maintenance ID 016 are sequentially reproduced. If a display instruction of clearance of a jam is received from the user, partial moving images C1, C2, C3, and C4 corresponding to a maintenance ID 019 are sequentially reproduced.

The optional reproduction moving image of the present exemplary embodiment includes the following characteristics. The optional reproduction moving image of replacement of a toner collection container conforms to a moving image to be reproduced when a maintenance event of a full state of waste toner occurs (maintenance ID 001). With respect to replacement of a toner container, the maintenance ID 016 is uniquely selected from among the maintenance IDs 002 to 016, so that a moving image corresponding to the maintenance ID 016 is reproduced as the optional reproduction moving image. Similarly, with respect to clearance of a jam, the maintenance ID 019 is uniquely selected from among the maintenance IDs 017 to 019, so that a moving image corresponding to the maintenance ID 019 is reproduced as the optional reproduction moving image.

FIG. 4B is a diagram illustrating the moving image table 410. In the moving image table 410, a moving image ID 411, a moving image file 412, a reproduction time 413, a cover opening/closing flag 414, and a message 415 are associated with each other.

The moving image ID 411 identifies a partial moving image, which is also used for the moving image list 402 of the moving image list table 400 described above. The moving image file 412 represents a name of the partial moving image file to be reproduced and a position of the partial moving image file in the storage 111. Herein, although it is assumed that the partial moving image file is stored in the storage 111, the partial moving image file can be stored in an external device, such as a server connected thereto via a network or a storage device connected thereto via a universal serial bus (USB) cable, and read out as necessary. The reproduction time 413 is a time from a start to an end of reproduction of the partial moving image.

The cover opening/closing flag 414 indicates whether the partial moving image illustrates the operation before or after opening the cover of the image forming apparatus 100. The cover opening/closing flag 414 indicates that the partial moving image illustrates the operation before opening the cover when a value thereof is 0, and indicates that the partial moving image illustrates the operation after opening the cover when a value thereof is 1. The message 415 is displayed while a corresponding partial moving image is being reproduced.

Operations illustrated in the respective partial moving image files are as follows.

A partial moving image A1 illustrates opening the front cover 202. A partial moving image A2 illustrates taking out the toner collection container 2. A partial moving image A3 illustrates attaching a new toner collection container and closing the front cover 202.

A partial moving image B1 illustrates opening the front cover 202. A partial moving image B2 illustrates taking out an empty black toner container. A partial moving image B3 illustrates attaching a new black toner container.

A partial moving image B4 illustrates taking out an empty yellow toner container. A partial moving image B5 illustrates attaching a new yellow toner container. A partial moving image B6 illustrates taking out an empty magenta toner container. A partial moving image B7 illustrates attaching a new magenta toner container.

A partial moving image B8 illustrates taking out an empty cyan toner container. A partial moving image B9 illustrates attaching a new cyan toner container. A partial moving image B10 illustrates closing the front cover 202.

A partial moving image C1 illustrates opening the right cover 201. A partial moving image C2 illustrates removing a jammed sheet in a vicinity of the discharge sensor 315 and a jammed sheet in a vicinity of the pre-registration sensor 317. A partial moving image C3 illustrates removing a jammed sheet in a vicinity of the two-sided conveyance sensor 316. A partial moving image C4 illustrates closing the right cover 201.

The moving image list 402 will be described in more detail with reference to FIG. 4A again. For example, if a jam occurs at the conveyance unit (maintenance ID 017), at first, the partial moving image C1 that illustrates opening the right cover 201 is reproduced. Then, the partial moving image C2 that illustrates removing jammed sheets in the vicinities of the discharge sensor 315 and the pre-registration sensor 317 and the partial moving image C4 that illustrates closing the right cover 201 are reproduced in that order. Herein, the partial moving image C2 illustrates clearing a jam at the conveyance unit as a maintenance event, and the partial moving image C1 illustrates preparing for the clearing.

In the below-described exemplary embodiment, a partial moving image that illustrates an operation to be executed prior to actually solving the maintenance event is called as "prior preparation moving image". A partial moving image that illustrates solving the maintenance event, i.e., a partial moving image illustrating the operation to be executed after the operation illustrated in the prior preparation moving image is executed, is called as "main content moving image". For example, when the maintenance ID is 001, the partial moving image A1 is the prior preparation moving image, and the partial moving images A2 and A3 are the main content moving images. If the maintenance ID is 002, the partial moving image B1 is the prior preparation moving image, and the partial moving images B2, B3, and B10 are the main content moving images. If the maintenance ID is 017, the partial moving image C1 is the prior preparation moving image, and the partial moving images C2 and C4 are the main content moving images.

In the present exemplary embodiment, a partial moving image associated with the cover opening/closing flag 414 with a value 0 is specified as the prior preparation moving image. A partial moving image associated with the cover opening/closing flag 414 with a value 1 is specified as the main content moving image.

FIGS. 5A to 7D are diagrams illustrating examples of screens displayed on the display device 115 in the present exemplary embodiment. Hereinafter, a general overview of transition of display screens in the present exemplary embodiment will be described with reference to FIGS. 5A to 7D. The CPU 101 executes a program stored in the storage 111 to generate display data, so that the screens in FIGS. 5A to 7D are displayed on the display device 115 via the display control unit 114.

<Display Example of Event Occurrence Moving Image>

Figure 5A:
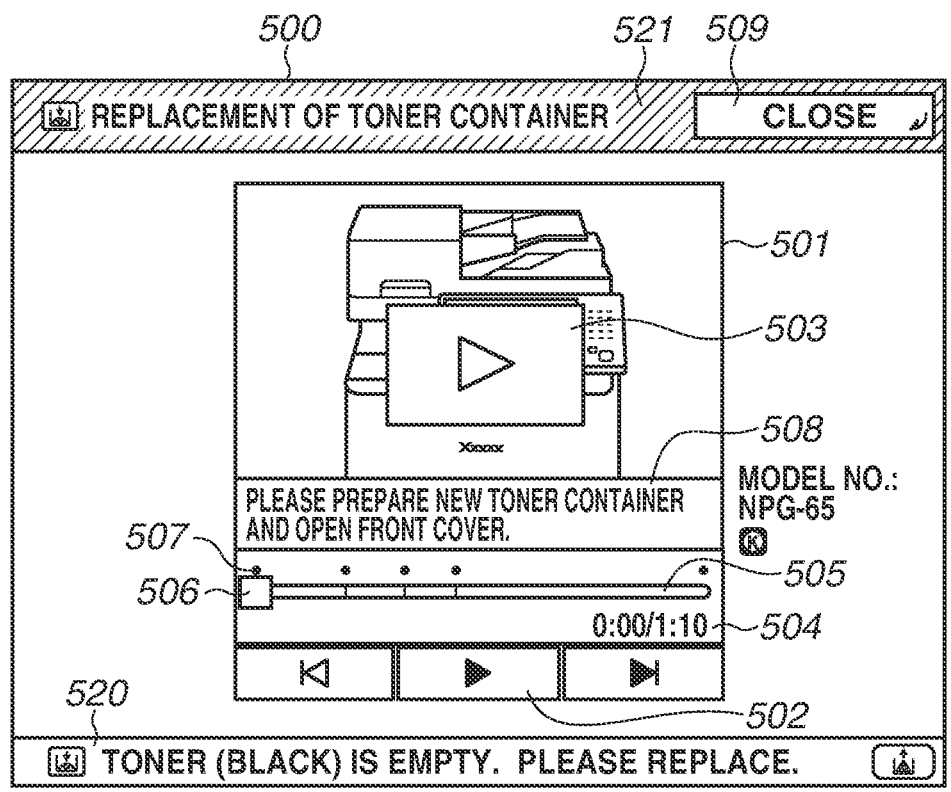
FIGS. 5A, 5B, 5C, 5D, 5E, 5F, 5G, and 5H are diagrams illustrating examples of screens displayed on a display device of the exemplary embodiment.

FIG. 5A is a diagram illustrating an example of a maintenance screen first displayed when occurrence of the maintenance event is detected. Herein, a moving image to be displayed at the time of detecting a lack of black toner (maintenance ID 002) will be described as an example. As defined in the moving image list table 400, when the maintenance ID is 002, partial moving images with the moving image IDs B1, B2, B3, and B10 are sequentially reproduced. In FIG. 5A, a screen in which the partial moving image B1 as a prior preparation moving image is stopped at the beginning is displayed.

A moving image display region 501, a reproduction button 502, a reproduction mark 503, a reproduction time display label 504, a bar 505, a slider 506, a chapter 507, a message region 508, and a close button 509 are displayed on a maintenance screen 500. A status display region 520 and a title display region 521 are displayed on the maintenance screen 500.

The moving image display region 501 displays the event occurrence moving image. The reproduction button 502 provides a reproduction instruction of the moving image. Similar to the reproduction button 502, the reproduction mark 503 provides a reproduction instruction of the moving image. When the reproduction button 502 or the reproduction mark 503 is pressed (touched), the CPU 101 starts reproducing the moving image.

The reproduction time display label 504 illustrates a total of the reproduction times of a plurality of partial moving images (referred to as "total reproduction time") and a time corresponding to the current reproduction position with respect to the total reproduction time. The bar 505 and the slider 506 indicate a reproduction position in the entire moving image and constitute a seeking bar enabling the user to provide an instruction of moving the reproduction position. The bar 505 schematically illustrates the total reproduction time. The slider 506 illustrates a current reproduction position, and the user uses the slider 506 to provide a moving instruction of the reproduction position.

The slider 506 moves within a range of the bar 505 based on a reproduction state of the moving image. The user can move the reproduction position to an optional position by dragging (moving) the slider 506. If an optional position of the bar 505 is pressed, reproduction of the moving image can be started from the position, and the slider 506 also moves based on the reproduction position. The chapter 507 indicates a sectioning position of the moving image.

The reproduction time display label 504 and the chapter 507 will be specifically described. As defined in the moving image list table 400, if the maintenance ID is 002, partial moving images B1, B2, B3, and B10 are sequentially reproduced. As defined in the moving image table 410, the reproduction times of the partial moving images B1, B2, B3, and B10 are 13 seconds (00:13), 10 seconds (00:10), 30 seconds (00:30), and 17 seconds (00:17), respectively. In the above, the total reproduction time is a sum of the reproduction times of the partial moving images to be reproduced. In this case, the total reproduction time is 1 minute 10 seconds (01:10). The reproduction time represents a current reproduction position with respect to the total reproduction time. For example, it is assumed that a scene after 5 seconds (00:05) from the beginning of the partial moving image B1 as a first reproduction moving image is displayed. In this case, the 5 seconds are simply taken as a reproduction time. It is also assumed that a scene after 10 seconds from the beginning of the partial moving image B2 as a second reproduction moving image is displayed. In this case, because reproduction of the partial moving image B1 is completed, 13 seconds as a reproduction time of the partial moving image B1 and 10 seconds as a time of the reproduced partial moving image B2 is added together, so that the reproduction time is calculated as 23 seconds (00:23). The reproduction time display label 504 is displayed as a character string in which the reproduction time calculated as the above and the total reproduction time are connected with a slash mark "/".

The chapter 507 is displayed at a sectioning position of a series of operations. The chapter 507 is displayed at three positions where reproduction of the partial moving image is switched (i.e., sectioning positions between the partial moving images B1 and B2, B2 and B3, and B3 and B10). The chapter 507 can also be displayed at two positions at the beginning and the end of the entire moving image. In the example of FIG. 5A, the chapter 507 is displayed at five positions.

A message for supplementing the contents of the reproducing moving image is displayed in the message region 508. Specifically, when the partial moving image B1 is reproduced, a message "PLEASE PREPARE NEW TONER CONTAINER AND OPEN FRONT COVER." is displayed based on the message 415 in the moving image table 410. In addition, the message region 508 can be hidden when a predetermined time passes after starting reproduction of the corresponding partial moving image, or can be continuously displayed while the corresponding partial moving image is being displayed. The close button 509 hides the displayed maintenance screen 500.

The status display region 520 displays a message corresponding to the maintenance event occurring in the image forming apparatus 100. When a plurality of maintenance events occurs, messages corresponding to respective maintenance events are alternately displayed in the status display region 520. In FIG. 5A, a message corresponding to a lack of black toner, i.e., "TONER (BLACK) IS EMPTY. PLEASE REPLACE." is displayed. The title display region 521 displays a title of the maintenance method displayed thereon.

Figure 5B:
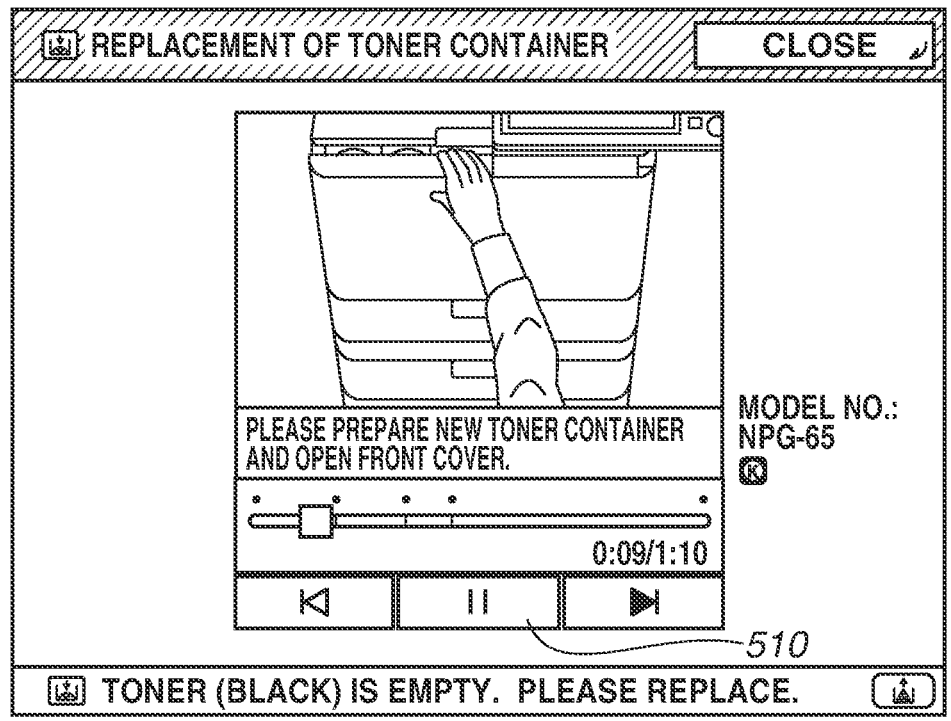

If the reproduction button 502 or the reproduction mark 503 is pressed at the screen in FIG. 5A, reproduction of the moving image starts. When the maintenance ID is 002, the CPU 101 starts reproducing the partial moving image B1 as a prior preparation moving image. FIG. 5B illustrates an example of a screen after 9 seconds from a start of reproduction of the partial moving image B1. Based on the start of reproduction of the moving image, the reproduction button 502 and the reproduction mark 503 are hidden, and a pause button 510 is displayed at the same position in place of the reproduction button 502.

Figure 5C:
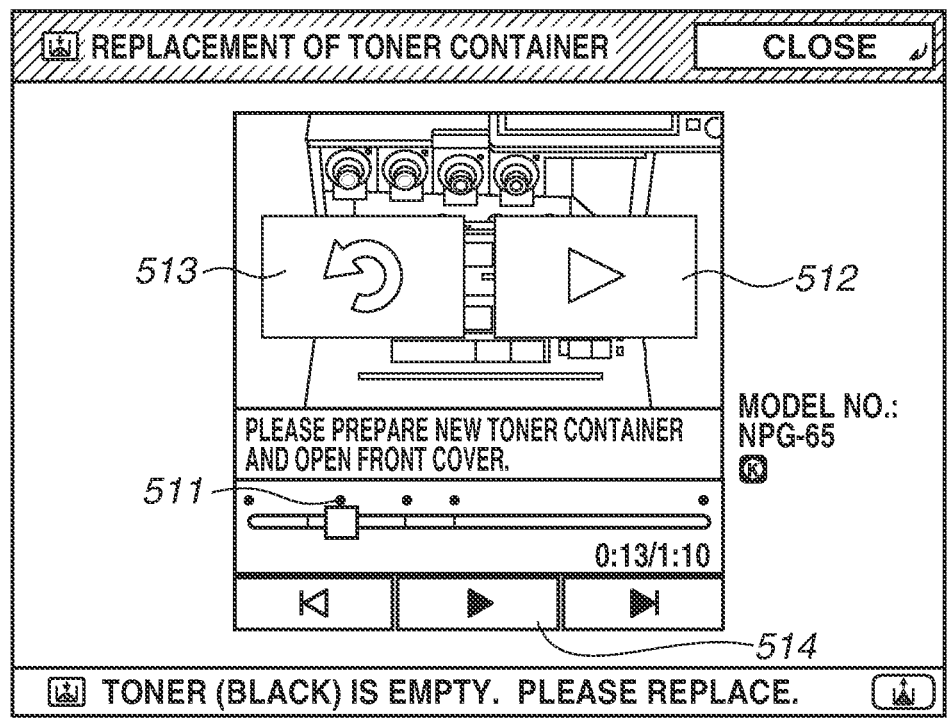

FIG. 5C is a diagram illustrating an example of the screen when the reproduction position reaches the end of the partial moving image B1. Reproduction of the moving image automatically stops tentatively at a time point at which reproduction of the partial moving image B1 ends, i.e., at a position of a chapter 511. Then, a replay mark 513 is displayed together with the reproduction mark 512. The pause button 510 is hidden, and the reproduction button 514 is displayed at the same position. The replay mark 513 provides an instruction of reproducing the paused partial moving image from the beginning. Specifically, when the replay mark 513 is pressed while the moving image is stopped at a position of the chapter 511, the CPU 101 moves the reproduction position to the beginning of the partial moving image B1 and restarts reproduction of the moving image.

Figure 5D:
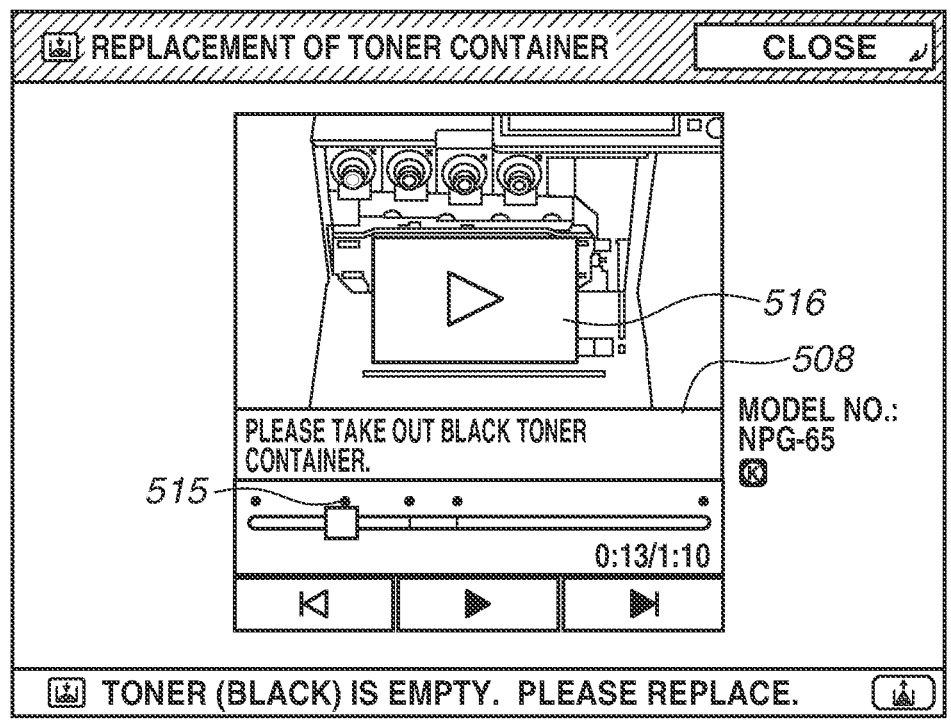

FIG. 5D is a diagram illustrating an example of a screen displayed in a case where opening of the front cover 202 is detected while the partial moving image B1 is being reproduced. In a case where opening of the front cover 202 is detected, the CPU 101 automatically ends the reproduction of the partial moving image B1 and displays a screen in which the partial moving image B2 as a first part of the main content moving image is stopped at the beginning (i.e., chapter 515). In this case, only the reproduction mark 516 is displayed. By displaying only the reproduction mark 516, the user is prompted to see the moving image illustrating the operation to be performed next. A message corresponding to the partial moving image B2, "PLEASE TAKE OUT BLACK TONER CONTAINER." is displayed in the message region 508. If the front cover 202 was previously opened, the replay mark 513 is not displayed because the partial moving image B1 does not have to be reproduced again.

As described above, in the display of the event occurrence moving image, the moving image automatically proceeds (skips) to the main content moving image if the operation illustrated in the prior preparation moving image is completed. This enables the user to comfortably start the next operation.

Figure 5E:
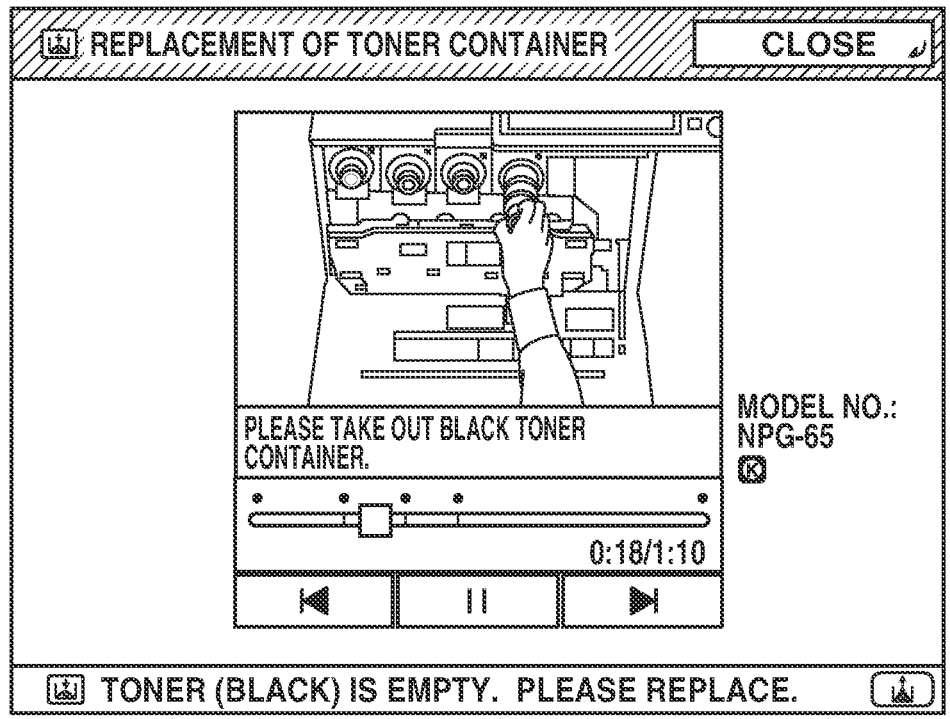

When the reproduction mark 512 (516) or the reproduction button 514 is pressed at the screen in FIG. 5C or 5D, reproduction of the partial moving image B2 starts. FIG. 5E is a diagram illustrating an example of a screen after 5 seconds from a start of reproduction of the partial moving image B2.

Figure 5F:
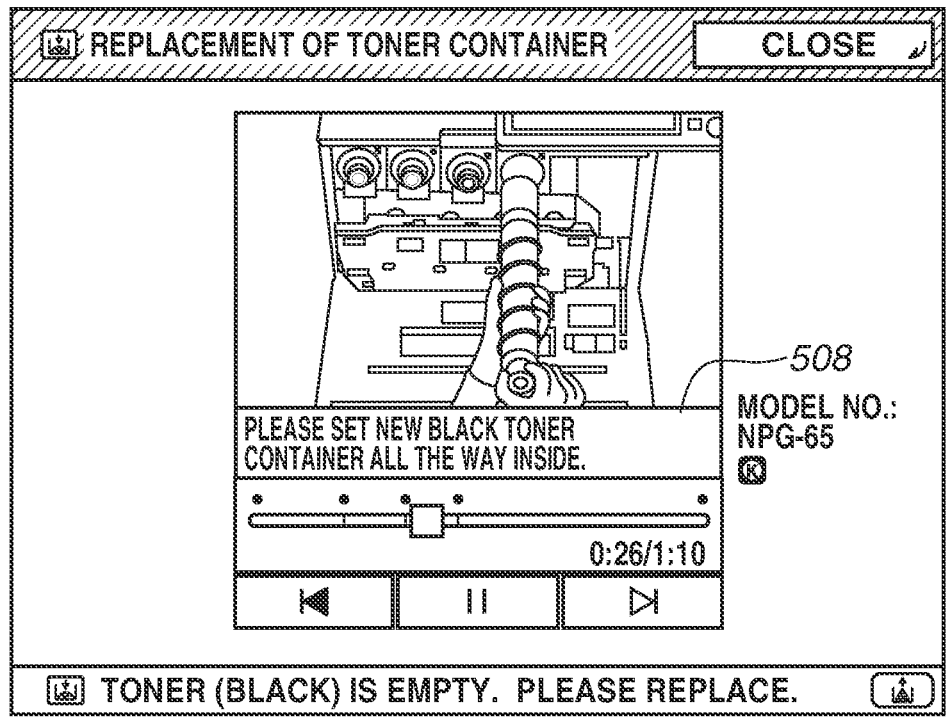

FIG. 5F is a diagram illustrating an example of a screen after 3 seconds from a start of reproduction of the partial moving image B3. In the screen in FIG. 5F, a message corresponding to the partial moving image B3, "PLEASE SET NEW BLACK TONER CONTAINER ALL THE WAY INSIDE." is displayed in the message region 508.

Figure 5G:
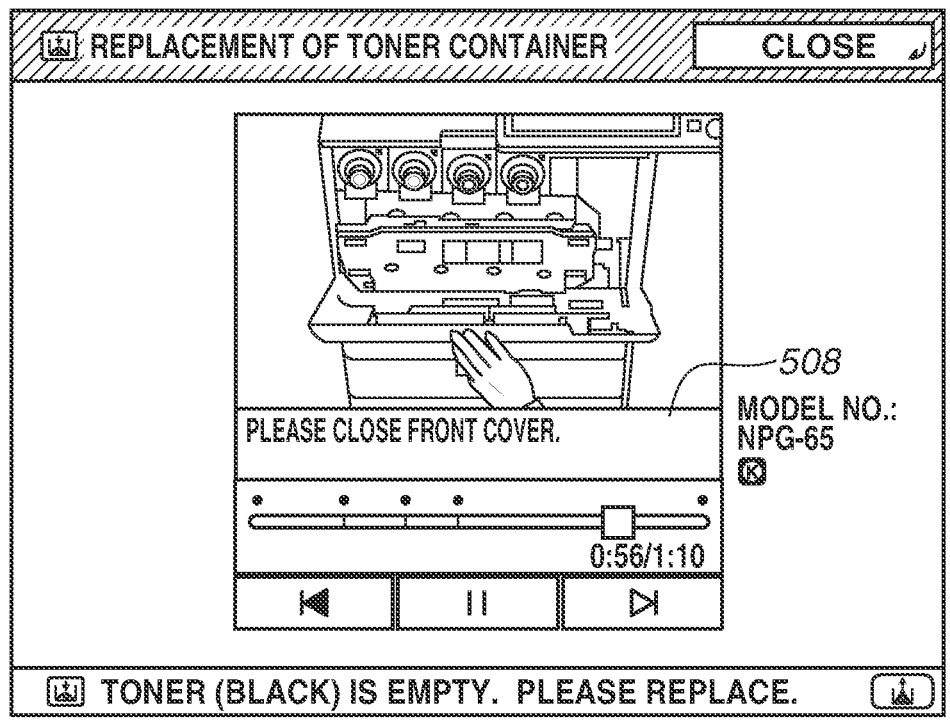

FIG. 5G is a diagram illustrating an example of a screen after 3 seconds from a start of reproduction of the partial moving image B10. In the screen in FIG. 5G, a message corresponding to the partial moving image B10, "PLEASE CLOSE FRONT COVER." is displayed in the message region 508.

Figure 5H:
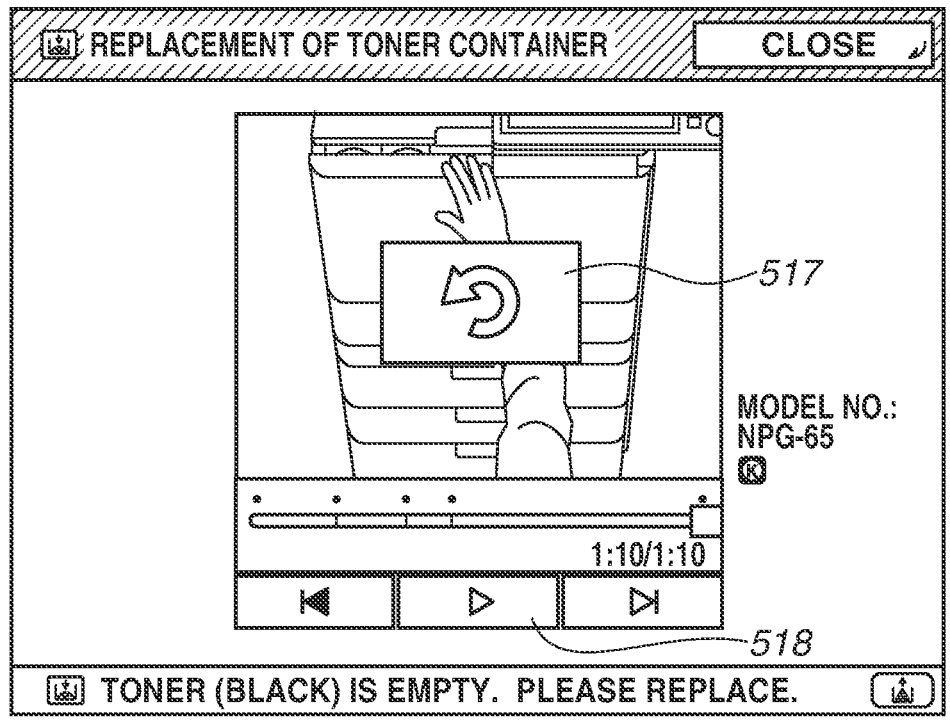

FIG. 5H is a diagram illustrating an example of the screen when the reproduction position reaches the end of the entire moving image (i.e., the end of the partial moving image B10 when the maintenance ID is 002). In this case, only the replay mark 517 is displayed without the reproduction mark because a partial moving image to be displayed next does not exist. In addition, in order to indicate that the reproduction button 518 is not operable, the reproduction button 518 is grayed out.

As described above, when a plurality of partial moving images corresponding to the occurring maintenance event is reproduced to the end, a screen different from a screen displayed when the moving image is tentatively stopped is displayed. This enables the user to recognize that the moving image has been reproduced to the end.

Figure 6A:
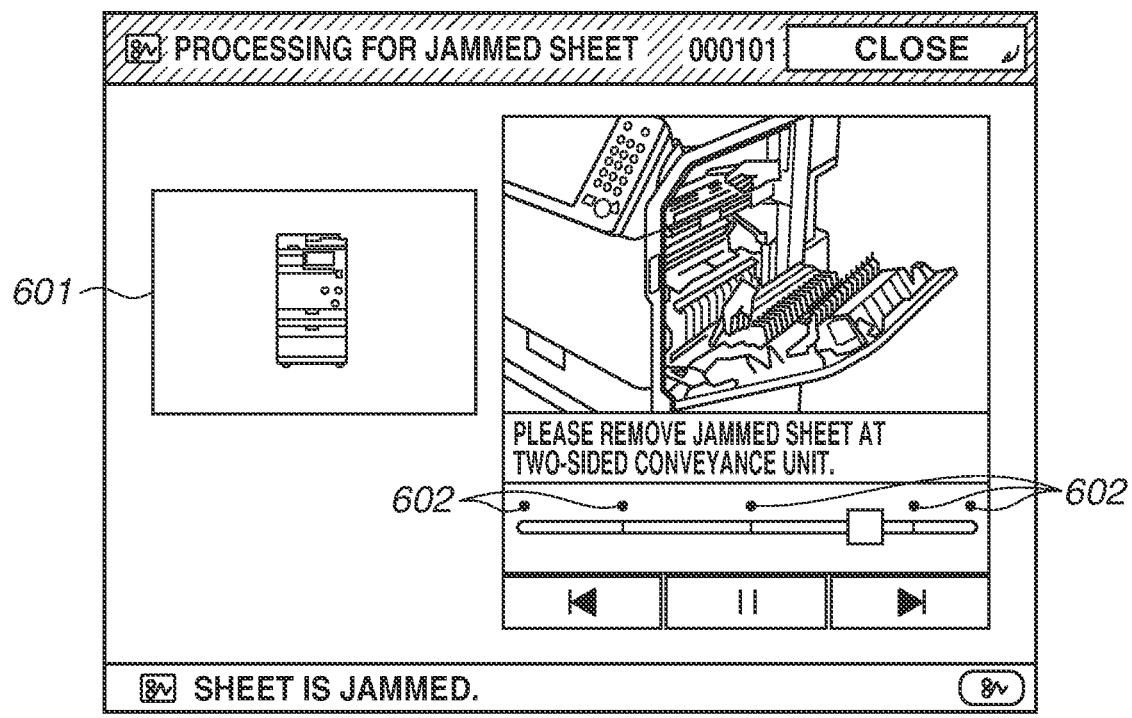
FIGS. 6A and 6B are diagrams illustrating examples of screens displayed on the display device of the exemplary embodiment.

FIG. 6A is a diagram illustrating a state where a compound jam at the conveyance unit and the two-sided conveyance unit is detected (maintenance ID 019), so that a screen in which a corresponding moving image is reproduced halfway is displayed. An icon 601 indicates a portion at which the jam has occurred in the image forming apparatus 100. Specifically, if the maintenance ID is 019, the compound jam occurs at the conveyance unit and the two-sided conveyance unit, thus the icon 601 indicates that the jam occurs at the conveyance unit and the two-sided conveyance unit. As defined in the moving image list table 400, if the maintenance ID is 019, partial moving images with the moving image IDs C1, C2, C3, and C4 are sequentially reproduced. A chapter 602 is displayed at the beginning and the end of the moving image as well as the sectioning positions of the respective partial moving images.

In FIG. 6A, reproduction of the partial moving image C2 illustrating the removal of jammed sheets in the vicinities of the discharge sensor 315 and the pre-registration sensor 317 ends. Then, the partial moving image C3 illustrating the removal of a jammed sheet in the vicinity of the two-sided conveyance sensor 316 is reproduced halfway. It is assumed that the user previously removed a jammed sheet in the vicinity of the discharge sensor 315 or a jammed sheet in the vicinity of the pre-registration sensor 317 based on the contents illustrated in the partial moving image C2.

Figure 6B:
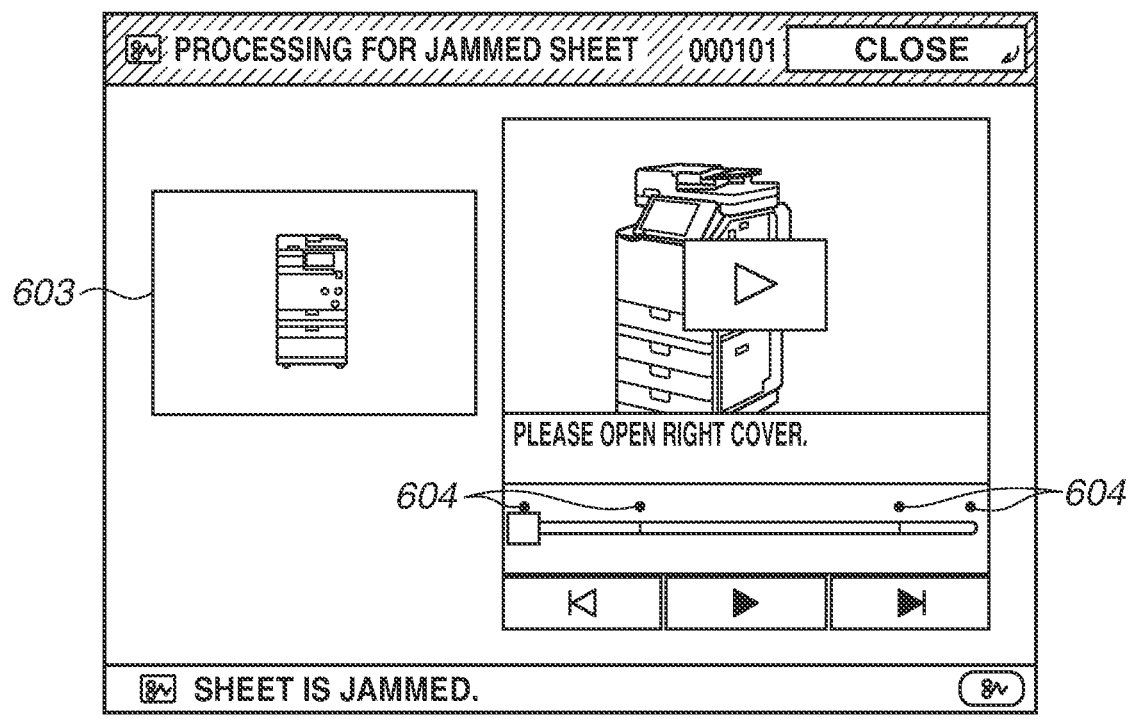

FIG. 6B is a diagram illustrating an example of a screen displayed if closing of the right cover 201 is detected while the screen in FIG. 6A is being displayed. In this case, while a jam at the conveyance unit is cleared, a jam at the two-sided conveyance unit has not yet been cleared. Therefore, the CPU 101 updates the maintenance ID and switches the display to the moving image corresponding to the jam at the two-sided conveyance unit (maintenance ID 018). Specifically, as defined in the moving image list table 400, when the maintenance ID is 018, partial moving images with the moving image IDs C1, C3, and C4 are sequentially reproduced. Therefore, the CPU 101 displays a screen in which the partial moving image C1 is stopped at the beginning. Display of an icon 603 and a chapter 604 are also updated.

As described above, when the event occurrence moving image is being displayed, the maintenance event occurring in the image forming apparatus 100 is confirmed again when closing of the cover is detected, and the moving image to be reproduced is also updated accordingly. Therefore, when the user solves a plurality of maintenance events, such as a jam at the conveyance unit and a jam at the two-sided conveyance unit, the user can check to what extent the operation has been safely completed by closing the cover.

<Display Example of Optional Reproduction Moving Image>

FIGS. 7A to 7D are diagrams illustrating examples of screens displayed when the user checks a series of operations necessary to solve a maintenance event when the maintenance event does not occur. Herein, it is assumed that the user provides an instruction for checking the operations of replacement of a toner container, replacement of a toner collection container, or clearance of a jam when the maintenance event such as a lack of toner, a full state of waste toner, or a jam does not occur.

First, the user operates the input device 113 to display a confirmation screen 700 of the maintenance method on the display device 115. The confirmation screen 700 of the maintenance method is used for selecting a maintenance method that the user would like to check from among the respective maintenance methods corresponding to a plurality of types of maintenance events.

Figure 7A:
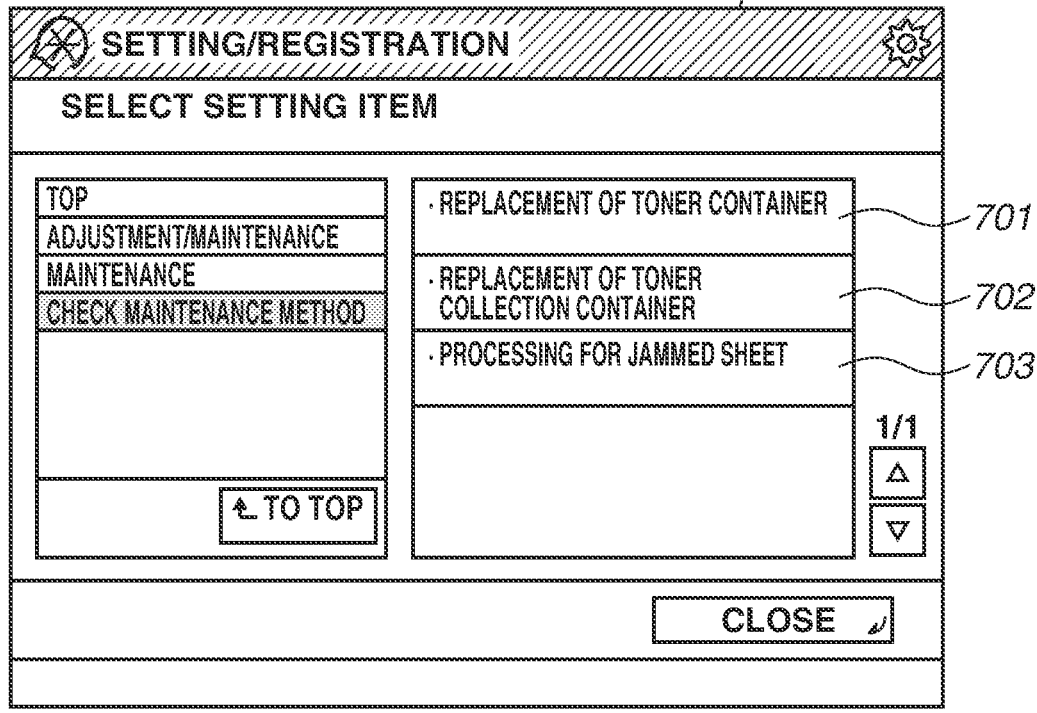
FIGS. 7A, 7B, 7C, and 7D are diagrams illustrating examples of screens displayed on the display device of the exemplary embodiment.
Figure 7B:
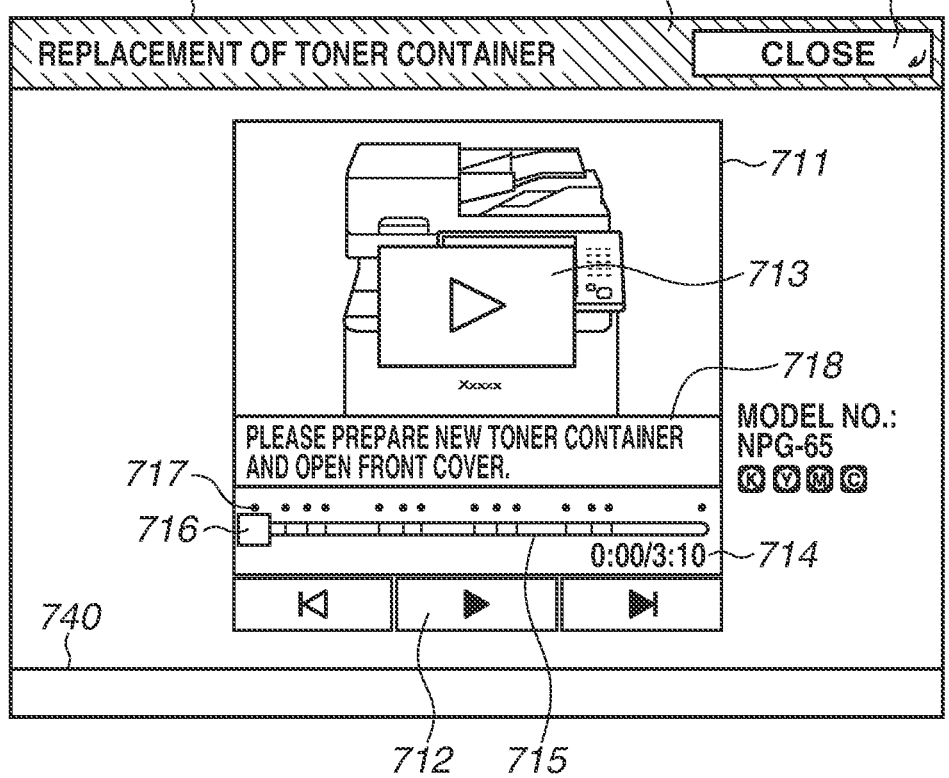

If a menu 701 "REPLACEMENT OF TONER CONTAINER" is selected in FIG. 7A, as illustrated in FIG. 7B, a maintenance screen 710 including a moving image illustrating the operations corresponding to replacement of a toner container is displayed.

A moving image display region 711, a reproduction button 712, a reproduction mark 713, a reproduction time display label 714, a bar 715, and a slider 716 are displayed on the maintenance screen 710. A chapter 717, a message region 718, a close button 719, and a status display region 740 are also displayed on the maintenance screen 710. The moving image display region 711 displays the optional reproduction moving image. As illustrated in FIG. 7B, when the maintenance event does not occur, a message corresponding to the maintenance event is not displayed in the status display region 740.

As with the case of the event occurrence moving image described in FIGS. 5A to 5H, when the reproduction button 712 or the reproduction mark 713 is pressed, reproduction of the moving image starts. Then, the reproduction button 712 and the reproduction mark 713 are hidden, and the pause button is displayed at the same position in place of the reproduction button 712. When the end of the partial moving image is reproduced, the reproduction of the moving image is tentatively stopped and a replay mark is displayed together with the reproduction mark 713.

Herein, if the maintenance screen 500 in FIG. 5A and the maintenance screen 710 in FIG. 7B are compared to each other, the title display region 521 of the maintenance screen 500 and a title display region 741 of the maintenance screen 710 are displayed in different colors. The title display region 521 of the maintenance screen 500 is displayed in orange, i.e., a color highly effective in drawing attention, whereas the title display region 741 of the maintenance screen 710 is displayed in gray, i.e., a color less effective in drawing attention. In FIGS. 5A and 7B, different types of hatched line are used to express the different colors.

As described above, even if the moving image reproduced in the moving image display region 501 and the moving image reproduced in the moving image display region 711 are the same, the title display regions 521 and 741 are displayed in different colors. With this configuration, the user can distinguish whether the displayed moving image is the event occurrence moving image or the optional reproduction moving image. Another display method can be used as long as the event occurrence moving image and the optional reproduction moving image can be distinguished from one another. For example, different colors can be used for the characters displayed in the title display regions 521 and 741, or different background colors can be used for the moving image display regions 501 and 711. The above-described display methods can be combined as appropriate.

According to the moving image list table 400, if "REPLACEMENT OF TONER CONTAINER" is selected (maintenance ID 016), partial moving images having the moving image IDs B1, B2, B3, B4, B5, B6, B7, B8, B9, and B10 are sequentially reproduced. In FIG. 7B, a screen in which the partial moving image B1 as a prior preparation moving image is stopped at the beginning is displayed. The maintenance screen 710 is hidden if the close button 719 is pressed at the screen in FIG. 7B.

Figure 7C:
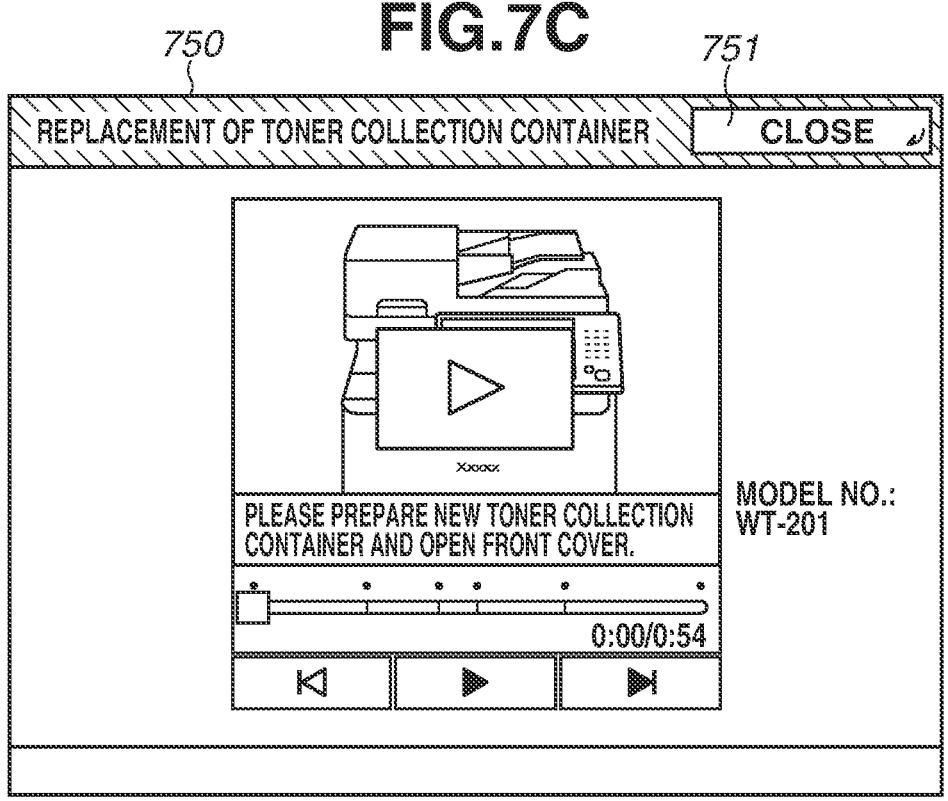

If a menu 702 "REPLACEMENT OF TONER COLLECTION CONTAINER" is selected in FIG. 7A, as illustrated in FIG. 7C, a maintenance screen 750 illustrating a moving image illustrating the operations corresponding to replacement of a toner collection container is displayed. As defined in the moving image list table 400, if "REPLACEMENT OF TONER COLLECTION CONTAINER" is selected (maintenance ID 001), partial moving images with the moving image IDs A1, A2, and A3 are sequentially reproduced. In FIG. 7C, a screen in which the partial moving image A1 as a prior preparation moving image is stopped at the beginning is displayed. The maintenance screen 750 is hidden if the close button 751 is pressed at the screen in FIG. 7C.

Figure 7D:
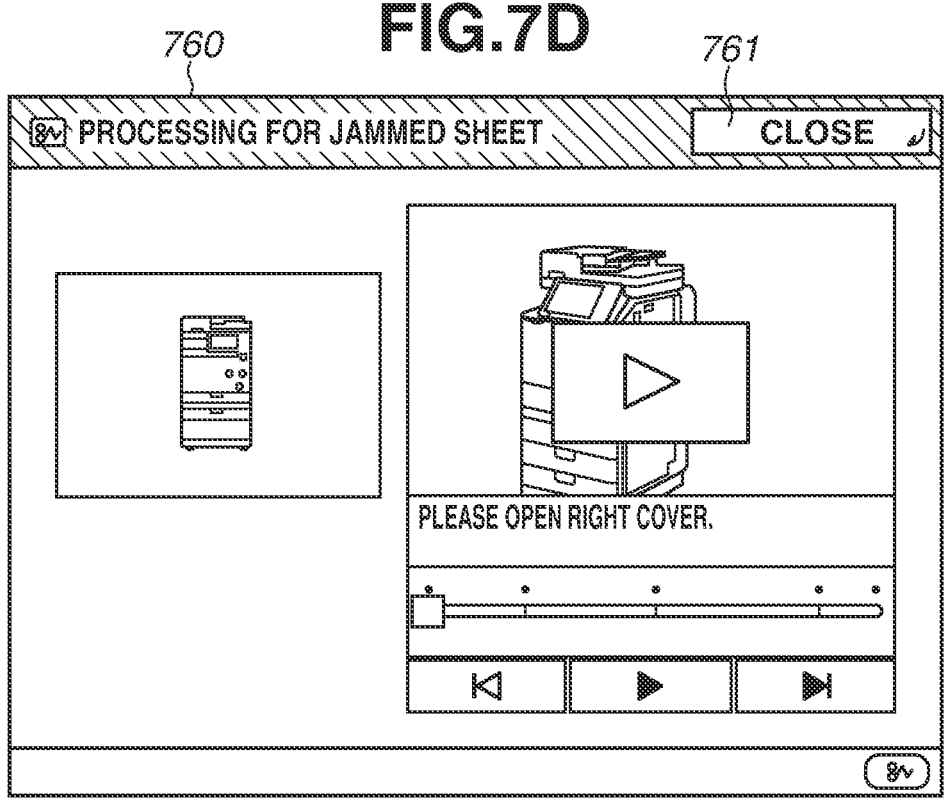

If a menu 703 "PROCESSING FOR JAMMED SHEET" is selected in FIG. 7A, as illustrated in FIG. 7D, a maintenance screen 760 including a moving image illustrating the operations corresponding to clearance of a jam is displayed. As defined in the moving image list table 400, if "PROCESSING FOR JAMMED SHEET" is selected (maintenance ID 019), partial moving images with the moving image IDs C1, C2, C3, and C4 are sequentially reproduced. In FIG. 7D, a screen in which the partial moving image C1 as a prior preparation moving image is stopped at the beginning is displayed. The maintenance screen 760 is hidden when the close button 761 is pressed at the screen in FIG. 7D. As described above, even when the maintenance event does not occur, the user can optionally check the operations of replacement of a toner container, replacement of a toner collection container, or clearance of a jam through the moving image.

Figure 11:
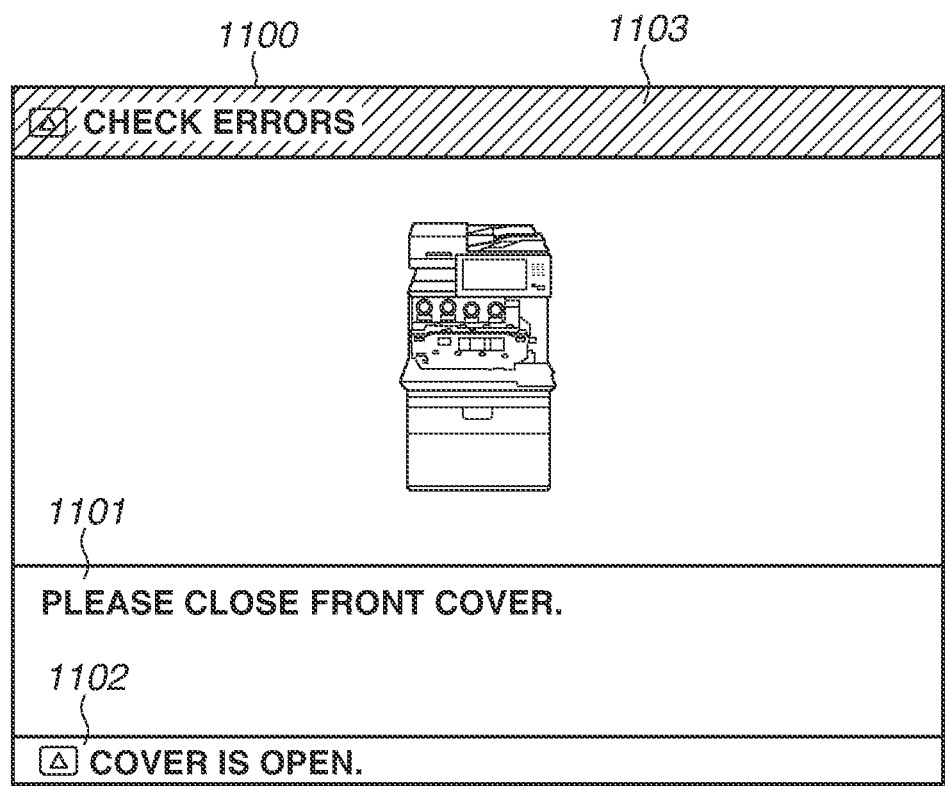
FIG. 11 is a diagram illustrating an example of a screen displayed on the display device of the exemplary embodiment.

If the right cover 201 or the front cover 202 is opened while the optional reproduction moving image is being displayed, a cover closing screen prompting the user to close the corresponding cover is preferentially displayed if a job in execution or in an execution queue exists. Herein, "job" refers to a job such as a print job or a copy job in which printing is executed by the printer device 106. If a job in execution or in an execution queue does not exist, the cover closing screen is not displayed. FIG. 11 is a diagram illustrating an example of a cover closing screen 1100 displayed when opening of the front cover 202 is detected. A cover closing message region 1101 and a status display region 1102 are displayed on the cover closing screen 1100. In FIG. 11, a message "PLEASE CLOSE FRONT COVER." is displayed in the cover closing message region 1101, and a message "COVER IS OPENED." is displayed in the status display region 1102. A title display region 1103 of the cover closing screen 1100 is expressed in orange, which is a color highly effective in drawing attention.

As described above, if a corresponding cover (e.g., the toner container 202, in case of replacement of the toner container) is opened while the optional reproduction moving image is being displayed, display or non-display of the cover closing screen is switched based on whether a job in execution or in an execution queue exists. If a job in execution or in an execution queue exists, the cover closing screen prompting the user to close the cover is displayed so that execution of the job can be prevented from being interrupted. If a job in execution or in an execution queue does not exist, i.e., if there is no possibility of interrupting execution of the job, the cover closing screen is not displayed so that the optional reproduction moving image is continuously displayed. Therefore, the user can optionally check the series of operations while checking a portion to be actually operated.

As described above, if the corresponding cover is opened while the optional reproduction moving image is being displayed, the moving image is not automatically switched to the main content moving image that is displayed while the event occurrence moving image is being displayed. This is because the optional reproduction moving image is displayed for the purpose of illustrating the overview of the maintenance operation to the user, and thus it is not necessary to switch the display to a moving image illustrating a next operation in cooperation with the operation of the user.

<Display Processing of Moving Image Illustrating Maintenance Method>

Figure 8:
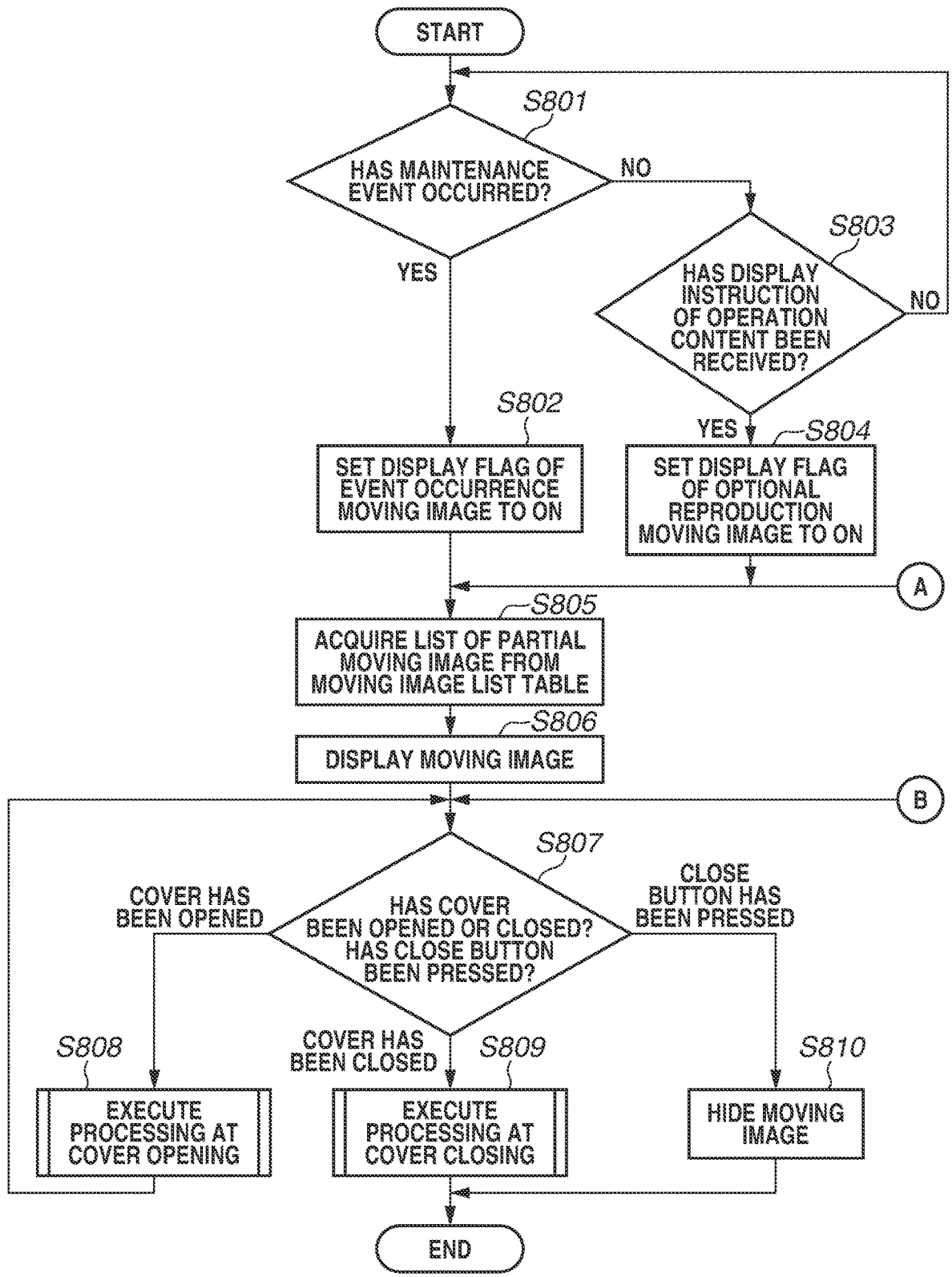
FIG. 8 is a flowchart illustrating display processing of a moving image illustrating a maintenance method according to a first exemplary embodiment.

Display processing of a moving image illustrating a maintenance method will be described with reference to FIG. 8. FIG. 8 is a flowchart illustrating display processing of a moving image illustrating a maintenance method according to the present exemplary embodiment. The processing illustrated in this flowchart is realized when the CPU 101 executes a program stored in the storage 111.

First in step S801, the CPU 101 determines whether a maintenance event, such as a lack of toner, a full state of waste toner, or a jam, has occurred. A lack of toner or a full state of waste toner is detected by the printer device 106, and a jam is detected by the discharge sensor 315, the two-sided conveyance sensor 316, or the pre-registration sensor 317. The CPU 101 then specifies a maintenance ID for identifying the detected maintenance event. For example, if a lack of black toner has occurred, the CPU 101 specifies the maintenance ID as 002.

If the CPU 101 determines that a certain maintenance event has occurred (YES in step S801), processing proceeds to step S802.

In step S802, the CPU 101 sets a display flag of the event occurrence moving image to ON. In step S801, if the CPU 101 determines that none of the maintenance events has occurred (NO in step S801), processing proceeds to step S803.

In step S803, the CPU 101 determines whether a display instruction of the operations of replacement of a toner container, replacement of a toner collection container, or clearance of a jam has been received. For example, the CPU 101 determines whether any one of the menus 701, 702, and 703, i.e., "REPLACEMENT OF TONER CONTAINER", "REPLACEMENT OF TONER COLLECTION CONTAINER", and "PROCESSING FOR JAMMED SHEET" has been selected on the confirmation screen 700 of the maintenance method in FIG. 7A. The CPU 101 specifies a maintenance ID corresponding to the selected menu. For example, if the menu 701 "REPLACEMENT OF TONER CONTAINER" is selected, the CPU 101 specifies the maintenance ID as 016.

In step S803, if the CPU 101 determines that a display instruction of certain operations has been received (YES in step S803), processing proceeds to step S804. In step S804, the CPU 101 sets a display flag of the optional reproduction moving image to ON. If a display instruction is not received in step S803 (NO in step S803), the processing returns to step S801.

Next, in step S805, the CPU 101 refers to the moving image list table 400 to acquire a list of partial moving images corresponding to the maintenance ID specified in step S801 or S803. For example, if the specified maintenance ID is 002, the partial moving images to be reproduced are B1, B2, B3, and B10. For example, the CPU 101 temporarily stores the plurality of specified partial moving images in the RAM 104 in that reproduction order as arrangement information.

In step S806, the CPU 101 reads the partial moving image corresponding to the ID of the first moving image in the RAM 104 and outputs the read moving image to the display device 115 in a stopped state. At this time, based on the contents of the display flag set in step S802 or S804, the CPU 101 controls the moving image to be displayed as the event occurrence moving image or the optional reproduction moving image.

As described above, different colors are used for the title display regions of the event occurrence moving image and the optional reproduction moving image. For example, if the maintenance ID is 002 while a display flag of the event occurrence moving image is ON, the CPU 101 reads the partial moving image B1 as a prior preparation moving image in the RAM 104 and outputs the partial moving image B1 to the display device 115 in a stopped state. Through the above processing, a screen illustrated in FIG. 5A is displayed on the display device 115.

If the maintenance ID is 016 while a display flag of the optional reproduction moving image is ON, the CPU 101 reads the partial moving image B1 as a prior preparation moving image in the RAM 104 and outputs the partial moving image B1 to the display device 115 in a stopped state. Through the above processing, a screen illustrated in FIG. 7B is displayed on the display device 115. After that, as illustrated in FIGS. 5A to 7D, reproduction of the moving image is started based on the user's operation of starting reproduction.

In step S807, the CPU 101 determines whether the right cover 201 or the front cover 202 has been opened or closed, or whether the close button has been pressed. In step S807, based on detection results of the sensors of the right cover 201 and the front cover 202, if the CPU 101 determines that one or more of the covers 201 and 202 has been opened (i.e., any cover has been switched to an opening state from a closing state) (COVER HAS BEEN OPENED in step S807), processing proceeds to step S808. Details of the processing in step S808 will be described below with reference to FIG. 9.

In step S808, based on detection results of the sensors of the right cover 201 and the front cover 202, if the CPU 101 determines that the opened cover has been closed (i.e., the cover has been switched to a closing state from an opening state) (COVER HAS BEEN CLOSED in step S807), processing proceeds to step S809. Details of the processing in step S809 will be described below with reference to FIG. 10.

In step S807, if the CPU 101 determines that the close button has been pressed (CLOSE BUTTON HAS BEEN PRESSED in step S807), processing proceeds to step S810. In step S810, the CPU 101 hides the displayed moving image. In a case where the event occurrence moving image is being displayed, the display flag of the event occurrence moving image is set to OFF. In a case where the optional reproduction moving image is being displayed, the display flag of the optional reproduction moving image is set to OFF. As described above, display processing of the moving image ends.

Figure 9:
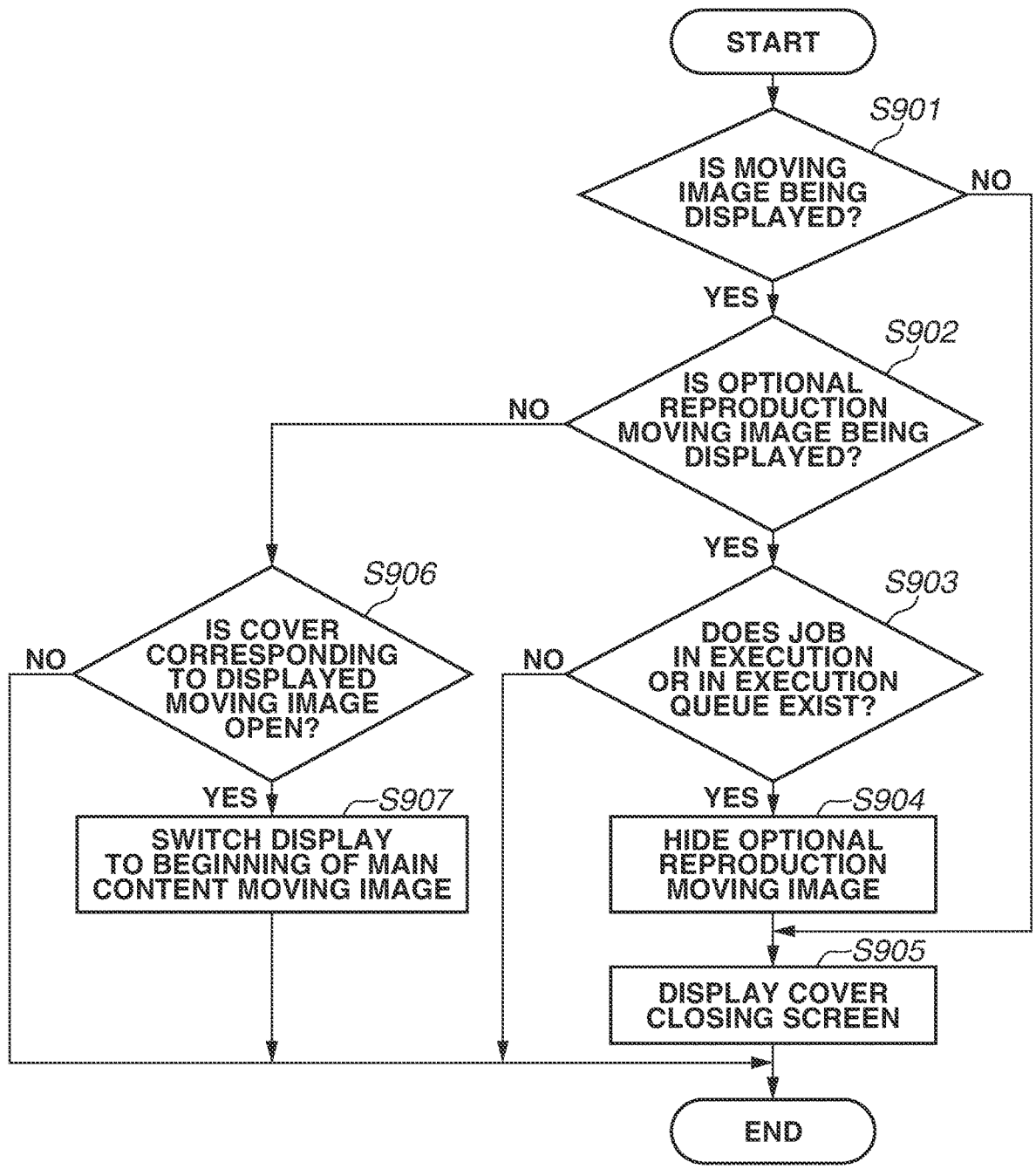
FIG. 9 is a flowchart illustrating display processing of a moving image illustrating a maintenance method according to the first exemplary embodiment.

FIG. 9 is a flowchart illustrating processing in step S808, which is executed if any one of the covers 201 and 202 has been determined to be open in step S807 in FIG. 8.

First, in step S901, the CPU 101 determines whether the moving image is being displayed. If the moving image is being displayed (YES in step S901), the processing proceeds to step S902. In step S902, based on the contents of the display flag set in step S802 or S804, the CPU 101 determines whether the displayed moving image is the event occurrence moving image or the optional reproduction moving image.

If the optional reproduction moving image is being displayed (YES in step S902), the processing proceeds to step S903. In step S903, the CPU 101 determines whether a job in execution or in an execution queue exists. Specifically, the CPU 101 inquires the printer control unit 105 about existence of a job in execution or in an execution queue to make the above determination.

If a job in execution or in an execution queue exists (YES in step S903), the processing proceeds to step S904. In step S904, the CPU 101 hides the optional reproduction moving image. At this time, the display flag of the optional reproduction moving image is not set to OFF because the optional reproduction moving image is temporarily hidden. Then, in step S905, the CPU 101 displays the cover closing screen 1100 to prompt the user to close the cover. If a job in execution or in an execution queue exists, display of the optional reproduction moving image is maintained.

As described above, even if the cover is opened while the optional reproduction moving image is being displayed, the optional reproduction moving image can be continuously displayed if there is no possibility of interrupting execution of the job. In other words, the user can optionally check the series of operations while checking the portion to be actually operated without interrupting execution of the job of the image forming apparatus 100.

In step S902, if the event occurrence moving image is being displayed (NO in step S902), processing proceeds to step S906. In step S906, the CPU 101 determines whether the opened cover corresponds to the displayed moving image. For example, in a case where a lack of black toner (maintenance ID 002) occurs, the partial moving image B1 that illustrates opening the front cover 202 is included. Therefore, based on a detection result of the sensor of the front cover 202, the CPU 101 determines whether the opened cover is the front cover 202. If the CPU 101 determines that the cover corresponding to the displayed moving image is open (YES in step S906), processing proceeds to step S907. Then, the CPU 101 reads the first partial moving image illustrating the operations after opening the cover in the RAM 104 based on the cover opening/closing flag 414 of the moving image table 410. In step S907, the CPU 101 outputs the read partial moving image to the display device 115 in a stopped state, and switches the display to the beginning of the main content moving image. For example, if the maintenance ID is 002, the beginning of the main content moving image, i.e., the first partial moving image indicated by the cover opening/closing flag 414 having a value 1, is the partial moving image B2. As described above, a screen illustrated in FIG. 5D is displayed on the display device 115. If the cover that does not correspond to the displayed moving image is open (NO in step S906), the display is not switched.

As described above, if the cover has been opened while the event occurrence moving image is being displayed, the event occurrence moving image is continuously displayed without displaying the cover closing screen 1100 regardless of presence or absence of a job. This is because clearance of the event should be prioritized over execution of the job if the maintenance event has occurred.

In step S901, if the moving image is not being displayed (NO in step S901), processing proceeds to step S905. In step S905, the CPU 101 displays the cover closing screen 1100.

Figure 10:
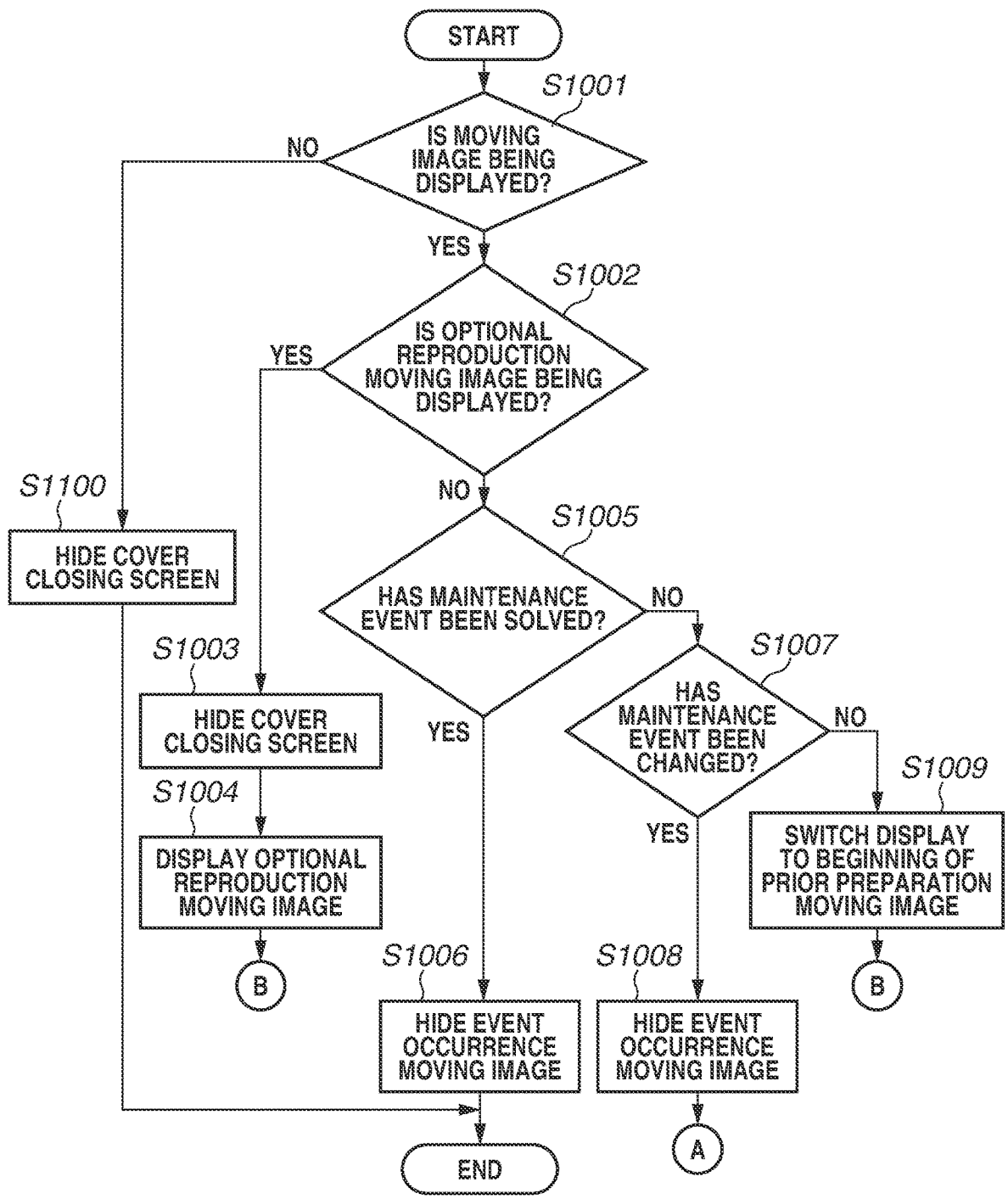
FIG. 10 is a flowchart illustrating display processing of a moving image illustrating a maintenance method according to the first exemplary embodiment.

FIG. 10 is a flowchart illustrating processing in step S809 that is executed if the CPU 101 determines that the opened cover has been closed in step S807 in FIG. 8.

First, in step S1001, the CPU 101 determines whether the moving image is being displayed. If the moving image is not being displayed (NO in step S1001), processing proceeds to step S1100. In step S1100, the CPU 101 hides the cover close screen 1100 displayed in step S905 in FIG. 9, and processing ends.

If the moving image is being displayed (YES in step S1001), processing proceeds to step S1002. In step S1002, based on the contents of the display flag set in step S802 or S804, the CPU 101 determines whether the displayed image is the event occurrence moving image or the optional reproduction moving image.

If the CPU 101 determines that the optional reproduction moving image is being displayed (YES in step S1002), processing proceeds to step S1003. In step S1003, the CPU 101 hides the cover closing screen 1100. Then, in step S1004, the CPU 101 redisplays the optional reproduction moving image that has been displayed before the cover closing screen 1100 is displayed, and processing returns to step S807 in FIG. 8.

In step S1002, if the CPU 101 determines that the event occurrence moving image is being displayed (NO in step S1002), processing proceeds to step S1005. In step S1005, the CPU 101 determines whether all of the maintenance events have been solved. For example, in a case where a compound jam of the conveyance unit and the two-sided conveyance unit occurs, and the right cover 201 is closed while the moving image corresponding thereto is being reproduced, the CPU 101 determines whether the compound jam has been solved based on the detection results of the discharge sensor 315, the two-sided conveyance sensor 316, and the pre-registration sensor 317.

In step S1005, if the CPU 101 determines that all of the maintenance events have been solved (YES in step S1005), processing proceeds to step S1006. In step S1006, the CPU 101 hides the event occurrence moving image and sets the display flag of the event occurrence moving image to OFF. As described above, display processing of the event occurrence moving image ends.

In step S1005, if the CPU 101 determines that all of the maintenance events are not solved (NO in step S1005), processing proceeds to step S1007. In step S1007, the CPU 101 determines whether there is any change in the occurring maintenance event. For example, in a case where the compound jam of the conveyance unit and the two-sided conveyance unit has occurred, the CPU 101 determines whether any one of the jams at the conveyance unit and the two-sided conveyance unit has been solved based on the detection results of the discharge sensor 315, the two-sided conveyance sensor 316, and the pre-registration sensor 317.

In step S1007, if the CPU 101 determines that there is a change in the occurring maintenance event (YES in step S1007), the processing proceeds to step S1008. In step S1008, the CPU 101 hides the event occurrence moving image, and processing returns to step S805 in FIG. 8. For example, it is assumed that the compound jam has occurred while the partial moving image is being reproduced, so that the user removes the jammed sheets in the vicinities of the discharge sensor 315 and the pre-registration sensor 317 and closes the right cover 201. At this time, the CPU 101 determines that the event has been changed to a jam at the two-sided conveyance unit, and specifies the maintenance ID as 018. If the specified maintenance ID is 018, the partial moving images to be reproduced are the partial moving images C1, C3, and C4. Therefore, in step S806, the CPU 101 reads the partial moving image C1 as a prior preparation moving image in the RAM 104 and outputs the partial moving image C1 to the display device 115 in a stopped state. With this processing, the display is switched to the screen in FIG. 6B from the screen in FIG. 6A.

In step S1007, if the CPU 101 determines that there is no change in the occurring maintenance event (NO in step S1007), the processing proceeds to step S1009. In step S1009, the CPU 101 switches the display to the beginning of the prior preparation moving image, and processing returns to step S807 in FIG. 8.

As described above, according to the present exemplary embodiment, in a case where any cover is opened while the optional reproduction moving image is being displayed, display or non-display of the cover closing screen is switched based on whether a job in execution or in an execution queue exists. The cover closing screen is displayed if a job in execution or in an execution queue exists, so that execution of the job can be prevented from being interrupted. If a job in execution or in an execution queue does not exist, the cover closing screen is not displayed, so that the user can check the actual portion to be operated based on the contents of the displayed moving image. Therefore, for example, it is possible to handle a case in which an installation technician of the image forming apparatus explains a maintenance method to a client in advance.

A second exemplary embodiment will now be described. In the first exemplary embodiment, if any cover is opened while the optional reproduction moving image is being displayed, the CPU 101 checks whether a job in execution or in an execution queue exists and switches display or non-display of the cover closing screen accordingly. Herein, even if a job in execution or in an execution queue does not exist at a point in time when the cover is opened, there can be a case where a job is newly input thereto from another user while the cover is open. In such a case, if the optional reproduction moving image is continuously displayed, execution of the job will be interrupted. Therefore, in the present exemplary embodiment, a method of addressing this situation will be described.

Figure 12:
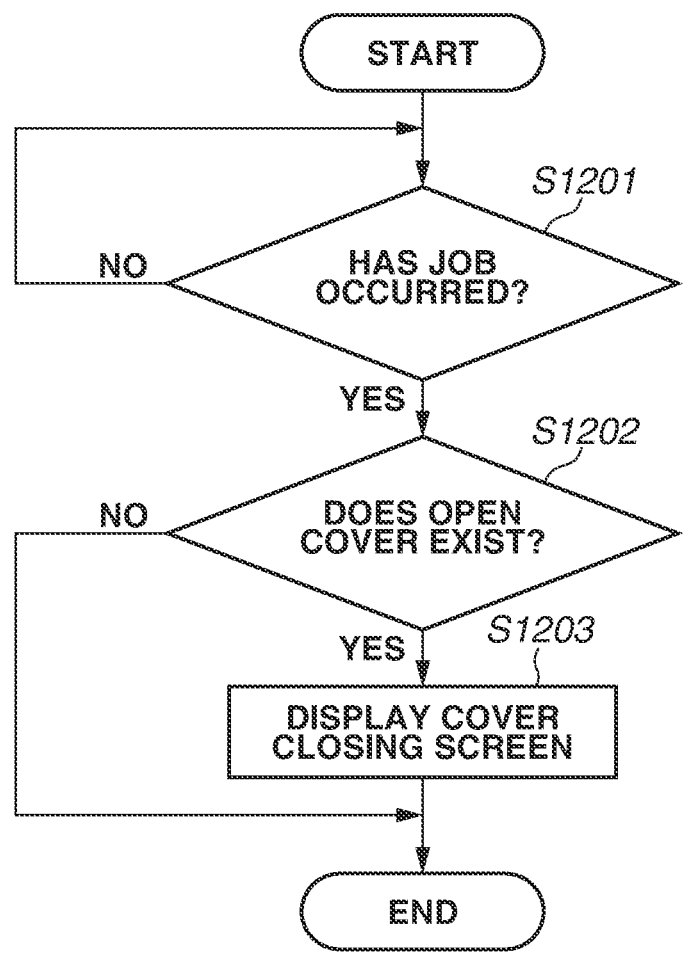
FIG. 12 is a flowchart illustrating display processing of a moving image illustrating a maintenance method according to a second exemplary embodiment.

FIG. 12 is a flowchart illustrating processing executed while the optional reproduction moving image is being displayed. The CPU 101 executes processing in FIG. 12 in concurrence with processing in FIG. 8 while the optional reproduction moving image is being displayed. The CPU 101 executes the program stored in the storage 111 to execute respective steps illustrated in the flowchart in FIG. 12.

In step S1201, the CPU 101 determines whether a job has occurred. Specifically, the CPU 101 checks whether occurrence of a print job has been notified from the printer control unit 105 to make the above determination.

If the CPU 101 determines that a job has occurred (YES in step S1201), processing proceeds to step S1202. In step S1202, based on the detection results of the sensors of the right cover 201 and the front cover 202, the CPU 101 determines whether any open cover exists.

If any open cover exists (YES in step S1202), processing proceeds to step S1203. In step S1203, the CPU 101 displays the cover closing screen 1100. If none of the covers are opened (NO in step S1202), processing in FIG. 12 ends.

As described above, according to the present exemplary embodiment, even if a job in execution or in an execution queue does not exist at a point in time when the cover is opened, the cover closing screen is displayed if a job is newly input from another user while the cover is open. With this configuration, the user can promptly address the situation in which execution of the job input from the outside is interrupted.

<The Other Exemplary Embodiments>

In the above-described exemplary embodiments, while the maintenance events, such as a lack of toner, a full state of waste toner, and a jam, have been described, a maintenance event other than the above, e.g., a lack of staples or the end of a drum lifetime, can also be detected.

In the above-described exemplary embodiments, while the image forming apparatus including a plurality of functions, such as a copy function and a scanner function, has been described as an example, above-described exemplary embodiments are also applicable to an image processing apparatus including only a part of the above functions.

Functions of the above-described exemplary embodiment(s) can be realized by supplying software (program) to a system or an apparatus via a network or various storage media so that a computer (or a CPU or a micro processing unit (MPU)) of the system or the apparatus reads and executes the program. In this case, the computer program and the storage medium storing that computer program constitute the invention.

According to an aspect of the present exemplary embodiment, display or non-display of the cover closing screen is appropriately controlled in a case where the cover is opened while a maintenance screen illustrating a maintenance method is being displayed.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-002711, filed Jan. 11, 2017, which is hereby incorporated by reference herein in its entirety.

What is claimed is:

1. A control method for an image processing apparatus, the control method comprising:
   detecting occurrence of a maintenance event;
   displaying, based on the detected occurrence of the maintenance event, a first maintenance moving image that shows processing for solving the maintenance event, and displaying, based on receiving a predetermined display instruction by a user in a state where occurrence of a maintenance event is not detected, a second maintenance moving image that shows processing for solving a maintenance event; and
   detecting whether a cover of the image processing apparatus is opened;
   wherein, if the moving image being displayed when the cover is opened is the second maintenance moving image and further if there is a print job where the cover is opened during the display of the second maintenance moving image for prompting the user to close the cover is displayed without displaying the second maintenance moving image, and if the moving image being displayed when the cover is opened is the second maintenance moving image and further if there is no print job where the cover is opened during the display of the second maintenance moving image, the second maintenance moving image is kept displayed without displaying the screen for prompting the user to close the cover;
   wherein the second maintenance moving image includes a moving image that corresponds to an operation of opening the cover.

2. The control method according to claim 1, wherein, in a case where the cover is detected to be opened while the first screen is being displayed, the cover closing screen is not to be displayed regardless of existence of a job in execution or in an execution queue.

3. The control method according to claim 2, the screen is switched to a screen to display an image illustrating contents of operation to be performed after opening the cover in a case where the cover is detected to be opened while the first screen is being displayed.

4. The control method according to claim 2 wherein it is determined whether the event has been solved in a case where the cover is detected to be closed while the first screen is being displayed.

5. The control method according to claim 4, wherein display of the first screen is ended in a case where it is determined that the event has been solved.

6. The control method according to claim 1, wherein the second screen is re-displayed in a case where the cover is detected to be closed after displaying the cover closing screen.

7. The control method according to claim 1 further comprising detecting occurrence of a job,
   wherein the cover closing screen is displayed in a case where occurrence of a job is detected while the second screen is being displayed.

8. The control method according to claim 1, wherein the image processing apparatus includes a printer that prints an image on a sheet based on image data, and
   wherein the job is a print job for executing printing using the printer.

9. The control method according to claim 1,
   wherein a screen for selecting content of operation to be displayed from among a plurality of sets of contents of operation is displayed, and
   wherein the display instruction of the contents of operation is received via the selection screen.

10. The control method according to claim 1, wherein the first screen and the second screen are displayed in different display modes.

11. The control method according to claim 10, wherein a predetermined region in the first screen and a predetermined region in the second screen are displayed in different colors.

12. The control method according to claim 11, wherein the predetermined region is a region where a title of the contents of operation is displayed.

13. The image processing apparatus according to claim 1, wherein the detected event is a lack of toner, and operation corresponding to the lack of toner is replacing a toner container.

14. The image processing apparatus according to claim 1, wherein the detected event is a jam of a sheet, and operation corresponding to the jam is removing a jammed sheet.

15. The control method according to claim 1, wherein each of the first maintenance moving image and the second maintenance moving image comprises a plurality of partial moving images corresponding respectively to a plurality of processing for solving the maintenance event.

16. The control method according to claim 1, wherein an alarm screen for prompting the user to close the cover is different from the partial moving images comprised in the first maintenance moving image for prompting the user to close the cover.

17. The control method according to claim 1, wherein the first maintenance moving image that shows processing for solving a first maintenance event and the second maintenance moving image that shows processing for solving the first maintenance event are different from each other.

18. An image processing apparatus comprising:
   a display;
   one or more memories that store a set of instructions; and
   one or more processors that execute the instructions to,
   detect occurrence of a maintenance event;
   cause the display to display, based on the detected occurrence of the maintenance event, a first maintenance moving image that shows processing for solving the maintenance event, and display, based on receiving a predetermined display instruction by a user in a state where occurrence of a maintenance event is not detected, a second maintenance moving image that shows processing for solving a maintenance event; and detect whether a cover of the image processing apparatus is opened;

wherein, if the moving image being displayed when the cover is opened is the second maintenance moving image and further if there is a print job where the cover is opened during the display of the second maintenance moving image a screen for prompting the user to close the cover is performed displayed without displaying the second maintenance moving image, and if the moving image being displayed when the cover is opened is the second maintenance moving image and further if there is no print job where the cover is opened during the display of the second maintenance moving image, the second maintenance moving image is kept displayed without displaying the screen for prompting the user to closer the cover, wherein the second maintenance moving image includes a moving image that corresponds to an operation of opening the cover.

19. A non-transitory computer-readable storage medium storing a control program for causing a computer in an image processing apparatus to execute a control method, the control method comprising:

detecting occurrence of a maintenance event;

displaying, based on the detected occurrence of the maintenance event, a first maintenance moving image that shows processing for solving the maintenance event, and displaying, based on receiving a predetermined display instruction by a user in a state where occurrence of a maintenance event is not detected, a second maintenance moving image that shows processing for solving a maintenance event; and detecting whether a cover of the image processing apparatus is opened;

wherein, if the moving image being displayed when the cover is opened is the second maintenance moving image and further if there is a print job where the cover is opened during the display of the second maintenance moving image a screen for prompting the user to close the cover is displayed without displaying the second maintenance moving image, and if the moving image being displayed when the cover is opened is the second maintenance moving image and further if there is no print job where the cover is opened during the display of the second maintenance moving image, the second maintenance moving image is kept displayed without displaying the screen for prompting the user to close the cover;

wherein the second maintenance moving image includes a moving iamge that corresponds to an operation of opening the cover.

* * * * *